(12) United States Patent
    Arnetoli

(10) Patent No.: US 10,314,229 B2
(45) Date of Patent: Jun. 11, 2019

(54) GRASS CUTTING HEAD WITH A SPOOL FOR THE CUTTING LINE, SPOOL FOR SAID HEAD, AND METHOD TO REPLACING THE CUTTING LINE IN A GRASS CUTTING HEAD

(71) Applicant: ARNETOLI MOTOR S.R.L., Reggello (IT)

(72) Inventor: Fabrizio Arnetoli, Reggello (IT)

(73) Assignee: ARNETOLI MOTOR S.R.L., Reggello (IT)

( * ) Notice: Subject to any disclaimer, the term of this patent is extended or adjusted under 35 U.S.C. 154(b) by 63 days.

(21) Appl. No.: 15/141,175

(22) Filed: Apr. 28, 2016

(65) Prior Publication Data

US 2017/0208739 A1    Jul. 27, 2017

(30) Foreign Application Priority Data

Jan. 21, 2016    (IT) .......................... 102016000005711

(51) Int. Cl.
    *A01D 34/416*    (2006.01)
(52) U.S. Cl.
    CPC ................................ *A01D 34/4166* (2013.01)
(58) Field of Classification Search
    CPC .......................... A01D 34/4166; A01D 34/416
    USPC ............................................... 30/276; 56/12.7
    See application file for complete search history.

(56) References Cited

U.S. PATENT DOCUMENTS

| 6,263,580 | B1 * | 7/2001 | Stark | A01D 34/4163 |
| | | | | 30/276 |
| 9,826,679 | B2 * | 11/2017 | Lang | A01D 34/4166 |
| 2004/0103543 | A1 * | 6/2004 | Fogle | A01D 34/416 |
| | | | | 30/276 |
| 2011/0239468 | A1 | 10/2011 | Conlon | |
| 2011/0302791 | A1 * | 12/2011 | Proulx | A01D 34/4165 |
| | | | | 30/287 |
| 2013/0133208 | A1 * | 5/2013 | Skinner | A01D 34/4163 |
| | | | | 30/347 |
| 2015/0327436 | A1 * | 11/2015 | Skinner | A01D 34/4163 |
| | | | | 30/276 |
| 2016/0106034 | A1 * | 4/2016 | Arnetoli | A01D 34/4166 |
| | | | | 30/276 |
| 2016/0128276 | A1 * | 5/2016 | Arnetoli | A01D 34/4166 |
| | | | | 30/276 |

FOREIGN PATENT DOCUMENTS

| CA | 2276976 A1 * | 1/2000 | ........... A01D 34/416 |
| WO | 2013/138752 A1 | 9/2013 | |
| WO | 2015/077393 A1 | 5/2015 | |
| WO | 2 923 549 A1 | 9/2015 | |

\* cited by examiner

*Primary Examiner* — Kenneth E Peterson
(74) *Attorney, Agent, or Firm* — McGlew and Tuttle, P.C.

(57) ABSTRACT

The grass cutting head (1) comprises a housing (3), inside which a spool (11) is provided to wind the cutting line (F). The housing has holes (9) for the passage of the cutting line (F) towards the outside of the housing. The spool (11) has at least a flange (15) with openings (31) allowing to insert the cutting line (F) into a passage defined between the flange (15) and a transverse wall (3B) of the housing.

12 Claims, 67 Drawing Sheets

GRASS CUTTING HEAD WITH A SPOOL FOR THE CUTTING LINE, SPOOL FOR SAID HEAD, AND METHOD TO REPLACING THE CUTTING LINE IN A GRASS CUTTING HEAD

TECHNICAL FIELD

The present invention relates to the field of gardening equipment, at both amateur and professional level. More in particular, the invention relates to improvements to grass cutting heads for brush cutters or the like, using, as vegetation cutting member, a line made for example of plastic.

BACKGROUND TO THE INVENTION

In the gardening field, both at professional and amateur level, cutting heads are used to cut vegetation. These heads are coupled to the rotary shaft of a bush cutter that can be actuated by an endothermic or electric engine. The cutting heads have different members to cut vegetation. In many cases, the cutting member is a plastic line with a suitable cross-section, for instance a circular cross-section. A length of cutting line is accumulated on a spool in form of turns wound around an axial body of the spool, preferably between two flanges of the spool. The two opposite ends of the cutting line project through suitable holes for the passage of the cutting line provided, for instance, in bushings arranged on the perimeter wall of a housing inside which the spool is housed.

In use, the grass cutting head is quickly rotated around the rotation axis thereof and the line portions projecting from the housing of the spool are tensioned due to the centrifugal effect and act on the vegetation, cutting it.

The line portions projecting from the housing of the grass cutting head are subject to wear and breakage, such that it is periodically necessary to supply new portions of cutting line from the inside of the grass cutting head, by rotating the spool with respect to the housing inside which it is contained. Once the length of cutting line inside the grass cutting head is finished, it is necessary to load a new cutting line in the grass cutting head. To this end, the grass cutting head is usually opened, the spool housing being comprised of two separable portions. The spool is removed from the housing and turns of cutting line are wound around it, thus forming a new length. The opposite ends of the cutting line project from the spool and are then guided through passage holes provided in the housing perimeter wall, before closing the housing with the spool housed therein. These operations are long-lasting and onerous.

Therefore, grass cutting heads have been developed, wherein the cutting line replacement, i.e. the formation of a new length inside the housing and around the spool, is done without opening the housing. To this end, grass cutting heads are usually provided, wherein the spool has a through diameter hole, through which the cutting line is inserted, guided through the two opposite passage holes provided in the housing. To perform this operation, it is necessary to align the diametrically opposite through holes provided in the spool body with the cutting line passage holes provided in the housing containing the spool. It is also necessary that the central part of the spool is empty, to allow the line to pass there through. It is often necessary to use a guiding element, for instance a tube, which is made pass through the grass cutting head to guide the cutting line; otherwise, the cutting line could not enter all the mutually aligned openings to pass through the grass cutting head.

If the spool is not empty inside, and for instance the axial space is occupied by the hub of the bush cutter or other mechanical members, inside the spool axial body a curved guiding channel is provided, through which the free end of the cutting line is made to pass so as to guide it through the grass cutting head. This operation is complex and requires spools having a complex shape, which are difficult to mold and which must be often manufactured by assembling pieces made of plastic or other material, which have been previously molded separately.

The above mentioned solutions are not satisfactory. There is therefore a need to provide grass cutting heads that partly or entirely overcome or alleviate one or more of the drawbacks of the prior art grass cutting heads, and that especially make the replacement of a cutting line length easier.

SUMMARY OF THE INVENTION

According to an aspect, a grass cutting head is provided comprising a housing with a perimeter wall extending around a rotation axis of the grass cutting head, and a wall transverse to the rotation axis. At least two holes for the passage of the cutting line are provided in the housing perimeter wall. The holes may be provided, for instance, in two bushings fastened in the housing perimeter wall. The grass cutting head also comprises a line winding spool, that can be housed in the housing and comprises an axial body and at least a first flange that is adjacent to the housing transverse wall when the spool is arranged in the housing; wherein the flange comprises a first surface facing the transverse wall and a second surface facing the axial body of the spool. A space is thus formed between the flange and the transverse wall for the passage of the cutting line that can be inserted transversally through the grass cutting head without opening this latter, by inserting the line through the two passage holes provided in the perimeter wall. Advantageously, the flange of the spool has at least a first pair of openings, communicating with a passage for the cutting line provided between the first flange and the transverse wall.

With this arrangement, a cutting line may be inserted through the two holes of the housing and through the pair of openings of the spool, passing through the spool flange and the transverse wall of the housing. To this end, the openings may be aligned with the line passage holes, to facilitate the insertion of the line.

With a grass cutting head of this type, a method for winding a length of cutting line in the grass cutting head can be performed, comprising the following steps:
  inserting a cutting line end through one of the two passage holes provided in the housing perimeter wall;
  guiding the cutting line end through the passage formed between the first flange of the spool and the transverse wall of the housing;
  inserting the cutting line end through the second hole for the cutting line passage and making it exit from the housing through the second line passage hole;
  moving a quantity of cutting line through the housing;
  winding a length of the cutting line on the spool by rotating the spool inside the housing with respect to the two cutting line passage holes, so as to form, on the spool, a series of line turns wound around an axial body of the spool, leaving two line segments projecting outside the housing through the two line passage holes.

In practical embodiments, the method furthermore comprises the step of making the cutting line pass through the two openings provided in the spool flange. These openings may be diametrically aligned with the line passage hole provided in the housing perimeter wall. However, this is not necessary.

The openings of the first spool flange may face the housing perimeter wall. In particular, the openings of the first flange may face the line passage holes provided in the housing perimeter wall when the openings are aligned with the holes.

Further advantageous embodiments of the grass cutting head according to the invention are described hereafter and in the appended claims, which form an integral part of the present description.

According to a further aspect, the invention relates to a spool for a cutting line of a grass cutting head, comprising an axial body and at least a first flange with a first surface facing the axial body and a second surface facing away from the axial body. The first flange has at least two openings putting the first surface of the flange into communication with the second surface of the flange.

In some embodiments of the spool, the openings of the spool flange extend from the first surface to the second surface of the flange.

The openings of the first flange may be approximately diametrically opposite to each other.

In some embodiments, more than two openings may be provided in the spool flange. Preferably, the number of openings is an even number; pairs of openings being preferably aligned diametrically. Moreover, pairs of diametrically aligned openings are angularly displaced with respect to each other around the rotation axis.

The spool may have a second flange, the first flange and the second flange being axially spaced apart, and the axial body of the spool being arranged between the first flange and the second flange.

The second flange, if any, may comprise openings for the line passage, substantially equal to the openings of the first flange.

In some embodiments of the spool, on the surface of the flange (or of each flange) of the spool facing away from the axial body of the spool, abutments may be provided in the form of teeth, projections or recesses, forming part of a device for the elongation of the cutting line, as described below. The flange abutments may be spaced apart from one another and the openings may be interposed between the flange abutments.

In some embodiments, the abutments are formed by cavities provided in the flange.

The spool may have a knob extending axially from the flange at the side facing away from the axial body of the spool, the knob projecting from the housing through the transverse wall. The knob may be configured like an element that can be coupled to and released from the spool flange.

To facilitate winding of the cutting line once it has been diametrically inserted through the cutting head, passing through the spool flange and the corresponding wall of the spool housing, the spool flange may comprise a truncated-conical portion. The openings may be provided along the truncated-conical portion. The truncated-conical portion of the flange may form a perimeter edge of the flange.

BRIEF DESCRIPTION OF THE DRAWINGS

The invention will be better understood by following the description and the accompanying drawing, which shows non-limiting practical embodiments of the invention. More in particular, in the drawing.

DETAILED DESCRIPTION OF EMBODIMENTS

Figure 1:
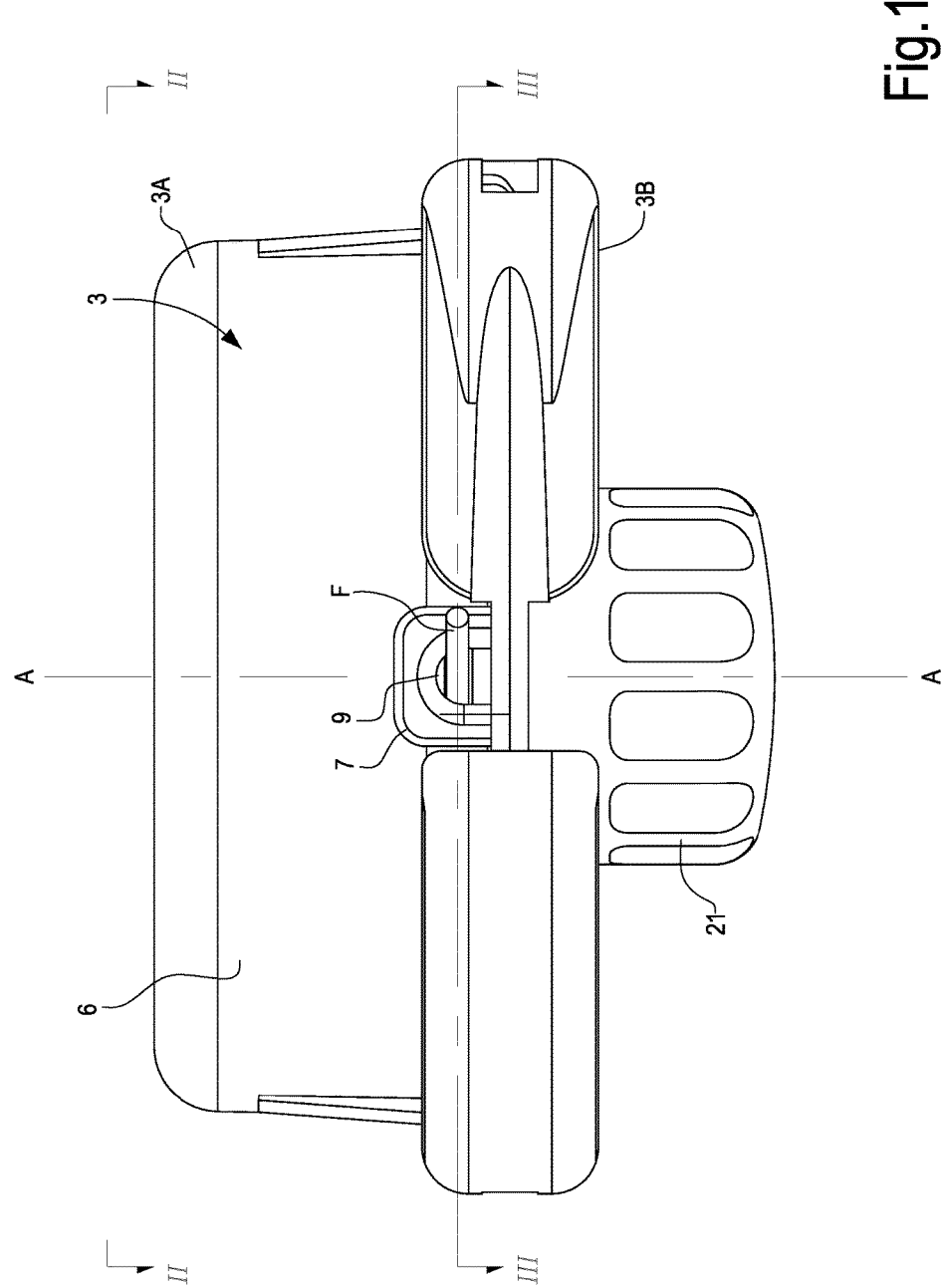
FIG. 1 is a side view of a first embodiment of a grass cutting head.
Figure 2:
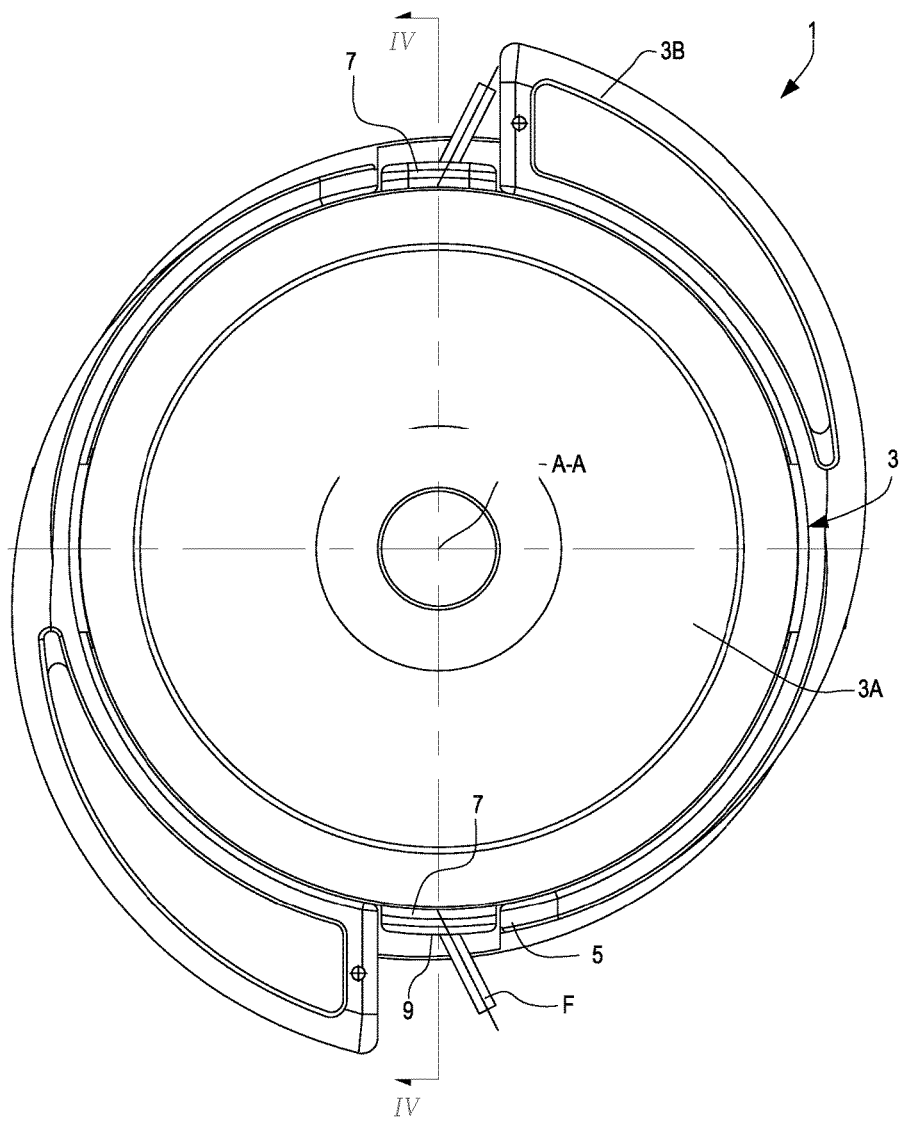
FIG. 2 shows a view according to II-II in FIG. 1.

The following detailed description of exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

In the following description, the terms "upper", "above", "high", "lower", "below", "low", and the like refer to the head in working position, with the rotation axis approximately orthogonal to the ground.

FIGS. 1 to 9 show a first embodiment of a grass cutting head according to the present invention. The grass cutting head is indicated as a whole with reference number 1. It comprises a housing 3, which may comprise a first portion 3A and a second portion 3B, which can be coupled together reversibly, for instance by means of snap elastic tabs. The housing 3 has a perimeter wall 5, which in the illustrated embodiment is formed by the upper portion 3A of the housing 3. The perimeter wall 5 has bushings 7 provided with holes 9, where through a cutting line F passes, projecting from the grass cutting head 1. In the illustrated example, two diametrically opposite bushings are provided, with respective holes 9 approximately aligned along a diameter of the grass cutting head.

In the housing 3 a spool 11 is provided, around which turns of cutting line F are wound to form a length of cutting line contained inside the grass cutting head 1.

FIGS. 5-9 show an embodiment of the spool 11 that can be used in the grass cutting head 1 of FIGS. 1-4. In this embodiment, the spool 11 has an axial body 13, which is hollow inside and which is integral with a first flange 15 and a second flange 17. The two flanges 15, 17 are spaced apart from one another in axial direction, i.e. along the axis A-A of the spool, so as to delimit an annular space 19 where turns of cutting line F may be wound, forming the length of cutting line.

When the spool 11 is housed in the housing 3 of the grass cutting head 1, the rotation axis A-A thereof matches the rotation axis of the grass cutting head 1, again indicated with A-A.

In the illustrated embodiment, the spool 11 has a knob 21 that axially projects beyond the flange 15 and that, when the spool is mounted in the cutting head 1, projects from the bottom of the head 1 so as to form an actuating member to actuate the spool so as to lengthen the portions of cutting line F projecting through the passage holes 9.

Figure 4:
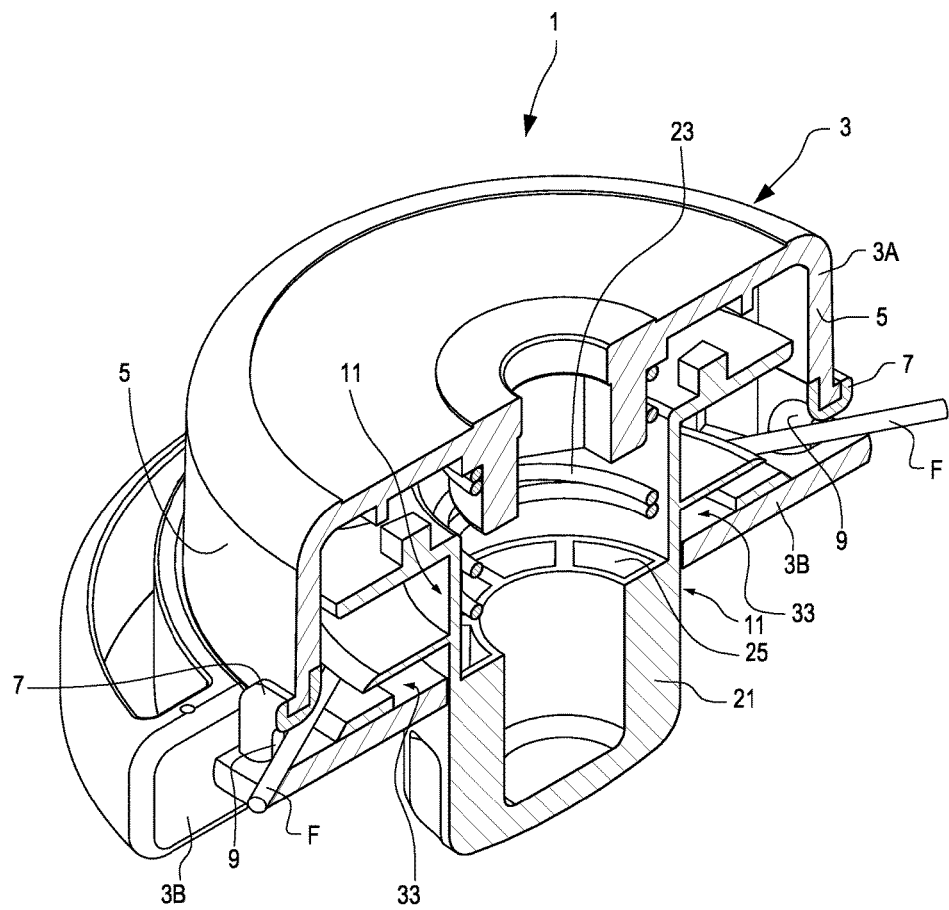
FIG. 4 shows an isometric section according to IV-IV of FIG. 2.
Figure 5:
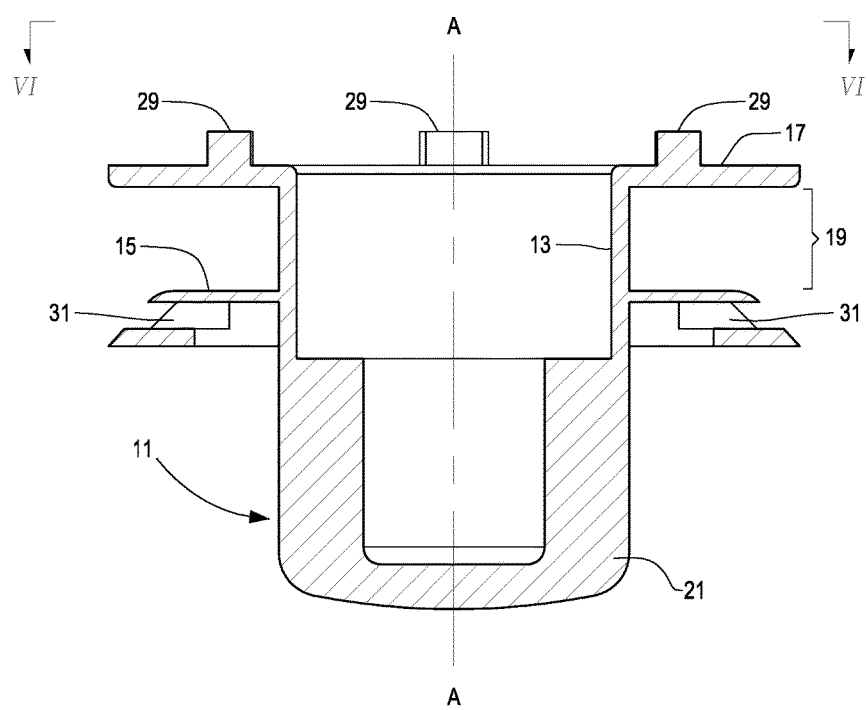
FIG. 5 shows a cross-section according to V-V of FIG. 6 of a spool that can be used with the head of FIGS. 1-3.
Figure 6:
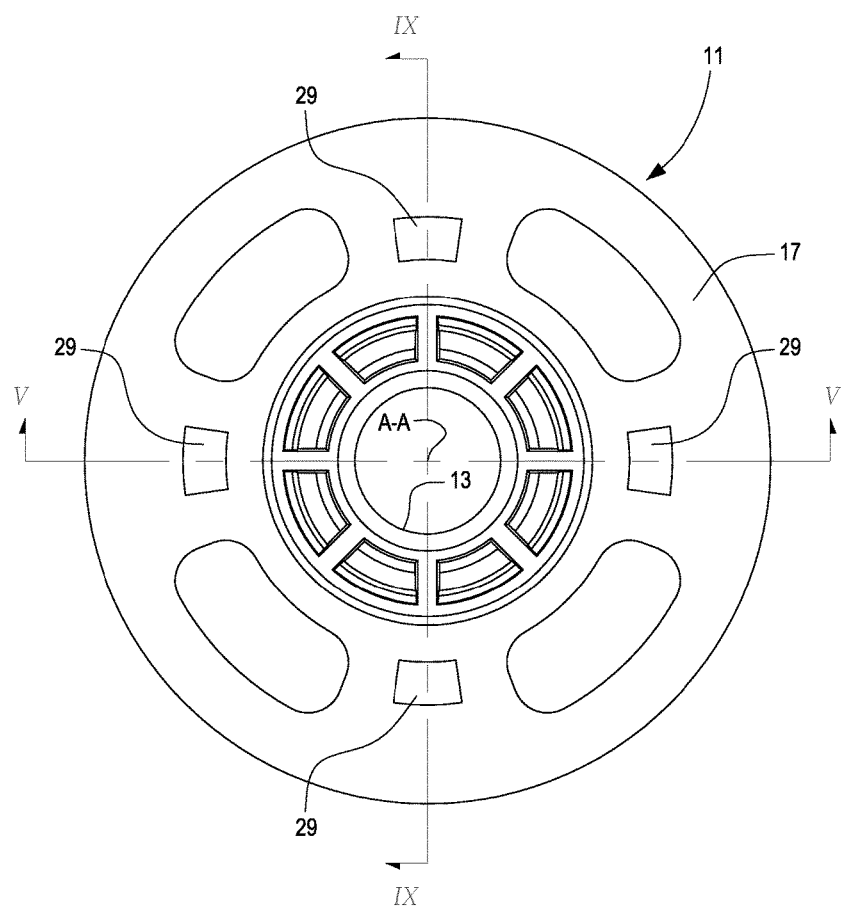
FIG. 6 shows a plan view according to VI-VI of FIG. 5.
Figure 7:
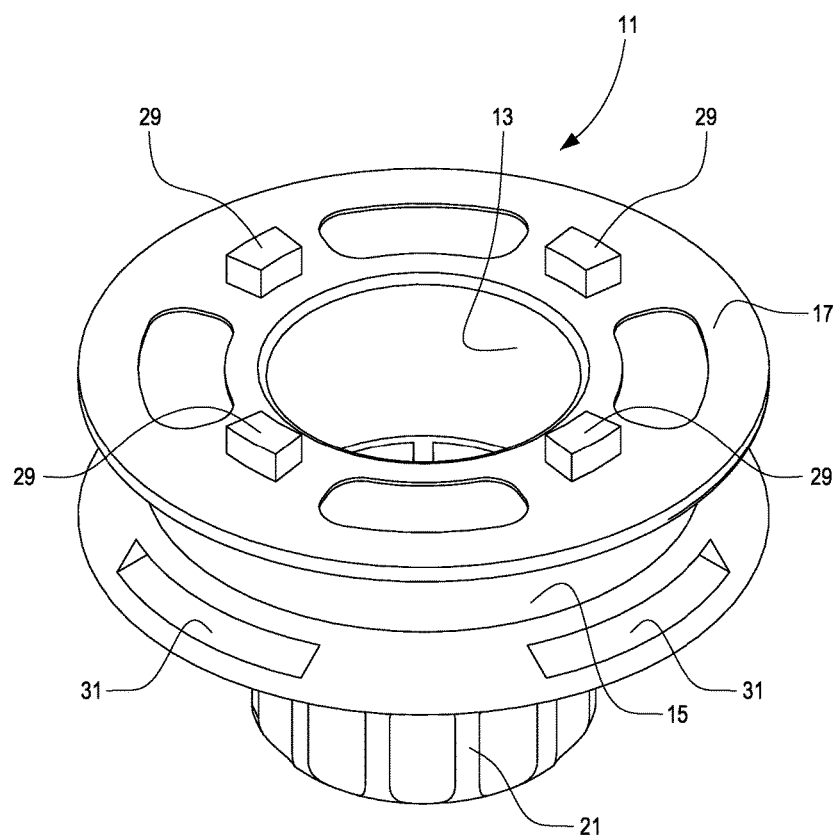
FIG. 7 is an isometric view from the top of the spool of FIGS. 5 and 6.

In the illustrated embodiment, the spool 11 is resiliently biased by a spring 23, for example a helical compression spring, which can be at least partially housed inside the axial cavity provided in the axial body 13 of the spool 11, as shown in particular in FIG. 4. The spring 23 is pressed between the upper portion 3A of the housing 3 and an annular abutment 25 provided in the axial body 13 of the spool 11. The spring 23 pushes the spool 11 against the lower portion 3B of the housing 3, so that abutments or recesses 27 (FIG. 8), provided on the lower surface of the flange 15 of the spool 11, engage locking teeth 28 provided in the lower portion 3B of the housing 3 and projecting towards the inside of the housing 3, for the purposes described below.

Front teeth 29 project from the upper surface of the upper flange 17 of the spool 11; these teeth cooperate with abutments, not shown, provided on the inner surface of the portion 3A of the housing 3. The arrangement of the front teeth 29, the abutments 27, the locking teeth 28 and the spring 23 is provided for lengthening the cutting line when the ends of the cutting line F projecting through the passage holes 9 are worn or broken during the use of the grass cutting head 1. The elongation is obtained in a known manner, by pushing the knob 21 of the spool 11 in order to move it alternatively in an axial direction so as to allow the spool 11 to make angularly stepped movements, thanks to the cooperation of the front teeth 29 and the abutments 27 of the spool with the corresponding teeth or abutments provided on the inner part of the housing 3 of the grass cutting head 1.

According to the invention, in the first flange 15 the winding spool 11 has at least two openings 31, for example in approximately diametrically opposite positions, passing through the flange 15. The openings 31 put the upper surface into communication with the lower surface of the flange 15. Essentially, through the openings 31 it is possible to pass from the upper surface of the flange 15 to the area below the flange, thus reaching, when the spool 11 is inserted in the housing 3, a space 33 (see in particular FIG. 4) delimited at the bottom by a transverse wall of the housing, constituted in this case by the lower portion 3B of the housing 3 and delimited at the top by the lower surface of the first flange 15. The space 33 is internally delimited by the axial body 13 of the spool 11.

Figure 3:
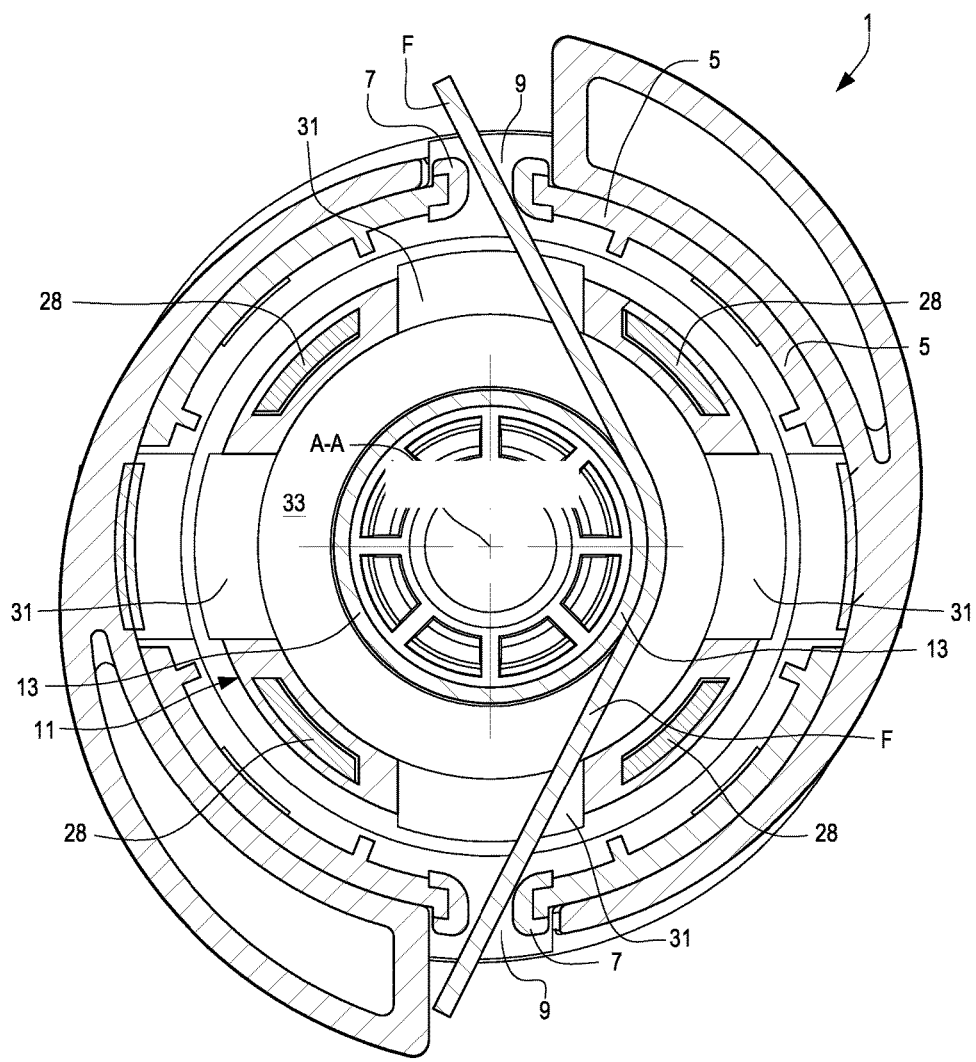
FIG. 3 shows a section according to III-III in FIG. 1.

In the cross-section of FIG. 3, the section plane crosses the space 33 that, as shown in the figure, has a substantially annular shape.

The space 33 defines a passage for the cutting line F, formed between the first flange 15 of the spool 11 and the wall transverse to the rotation axis A-A of the head 1 constituted, in the illustrated embodiment, by the lower portion 3B of the housing 3.

As it is clearly apparent from FIGS. 3 and 4, by arranging the diametrically opposite openings 31 provided in the flange 15 in front of the passage holes 9 provided in the bushings 7, it is possible to insert the cutting line F through a first bushing 7 and then through the respective passage hole 9, and to guide the cutting line F under the flange 15, between the flange and the transverse wall formed by the lower portion 3B of the housing 3, until the cutting line F reaches the passage hole 9 that is diametrically opposite to the hole through which the line has been inserted. It is therefore possible to transversally, i.e. diametrically, introduce the cutting line F in the grass cutting head 1 without opening this latter, by passing the cutting line F not through the spool 11, for instance in diameter holes provided in the axial body thereof as in the prior art heads, but through the space 33 provided between the flange 15 and the transverse wall 3B, and therefore outside with respect to the space 19 where the cutting line is wound around the axial body 13 of the spool.

To replace a length of cutting line F inside the grass cutting head 1, it is sufficient to insert the cutting line F as described above and shown in FIG. 3, making a sufficient length of cutting line project from both the passage holes 9, the sufficient length being approximately equal to the half of the length that shall be accumulated in the grass cutting head 1. Then, the spool 11 and the housing are rotated with respect to each other. By rotating the spool 19 in the housing 3, the cutting line F begins to wind in turns formed in the space 19 defined between the first lower flange 15 and the second upper flange 17. The shape of the perimeter edge of the first flange 15, in which the openings 31 are provided, facilitates the insertion of the turns of cutting line F in the space 19 during the rotation of the spool 11 with respect to the housing 3. In fact, in the illustrated embodiment this perimeter edge is provided in an outer truncated-conical portion of the flange 15, on which the cutting line slides when the spool 11 rotates inside the housing 3.

In the embodiment illustrated in FIGS. 5-8, the spool 11 has two pairs of openings 31 diametrically opposite to each other, and this facilitates the insertion of the cutting line F through the grass cutting head 1, as the spool 11 and the housing 3 can take at least two mutual angular positions; in both positions, a pair of diametrically opposite openings 31 is approximately aligned with the passage holes 9.

Figure 8:
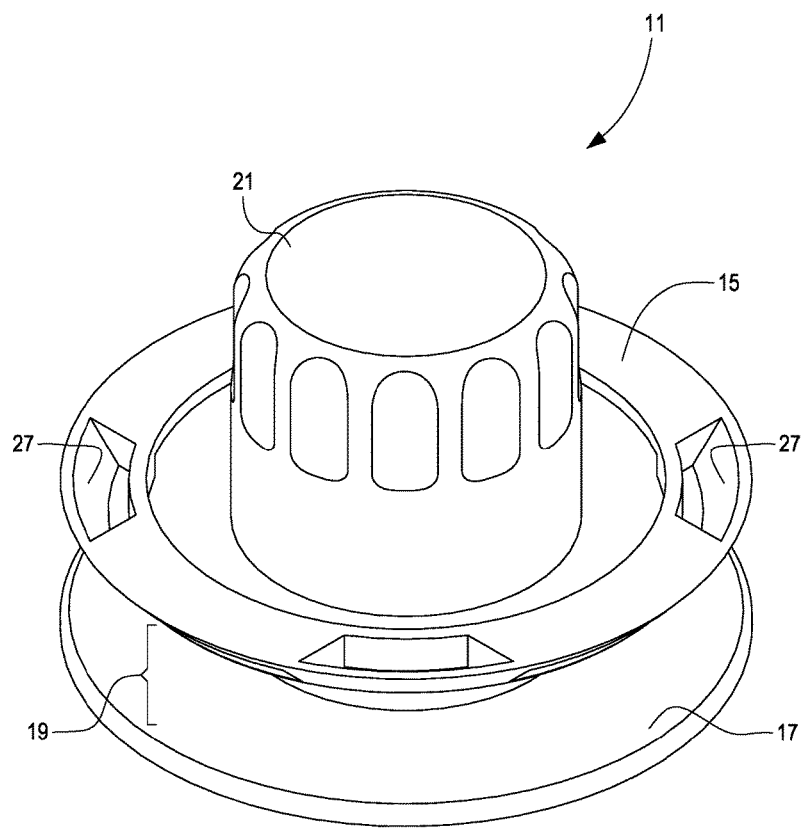
FIG. 8 is an isometric view from the bottom of the spool of FIGS. 5 to 7.
Figure 9:
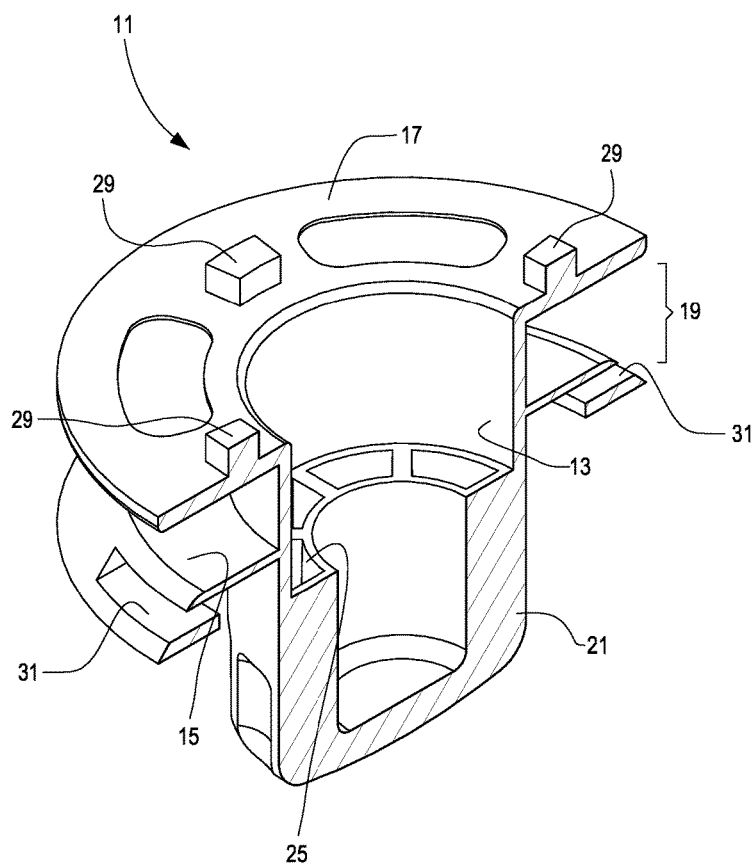
FIG. 9 is an isometric cross-section according to IX-IX of FIG. 6.

As shown in particular in FIG. 8, which illustrates an isometric view from the bottom of the spool 11, in the portions of the flange 15 interposed between the positions where the openings 31 are provided, in the lower surface of the flange 15 cavities are provided, forming the abutments 27 where the teeth 28 engage, which are integral with the lower transverse wall constituted by the portion 3B of the housing 3.

Figure 3A:
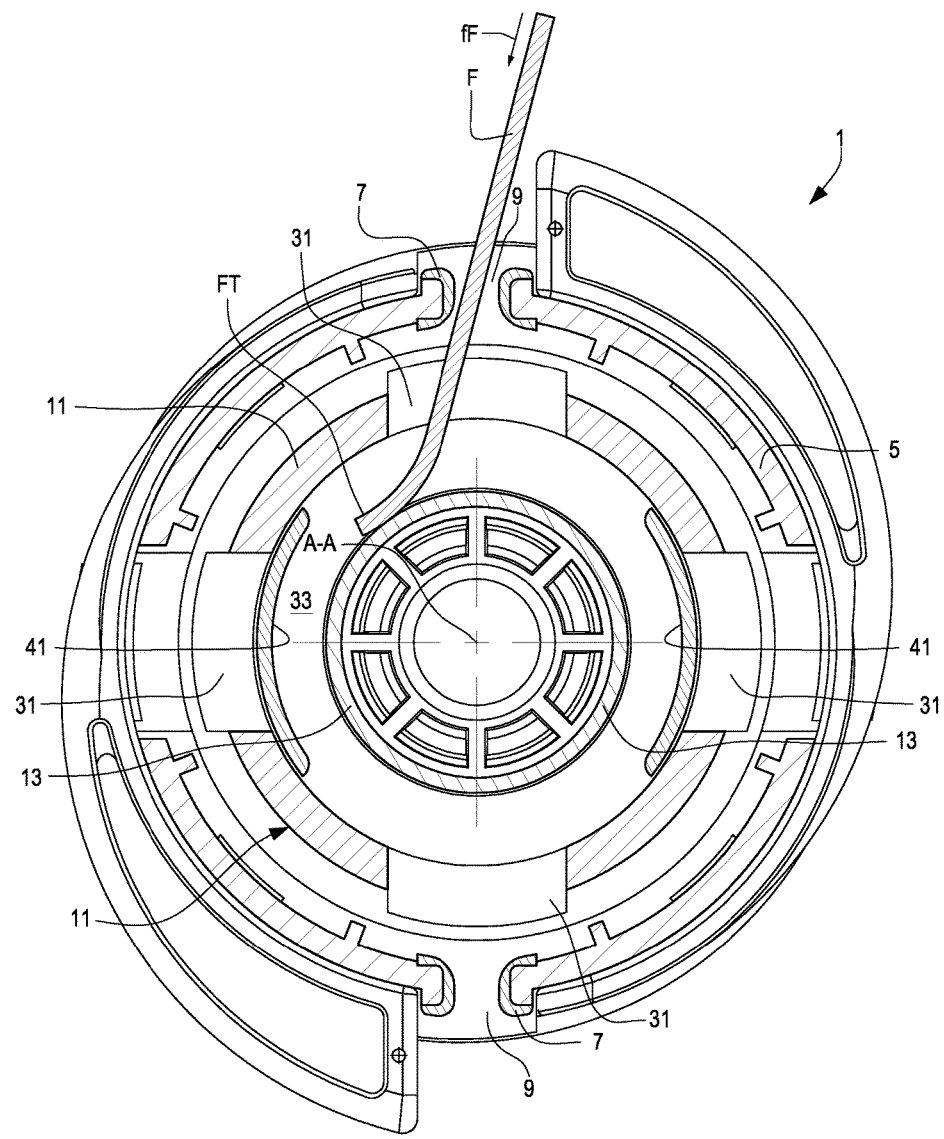
FIGS. 3A, 3B and 3C show a cross-section similar to the section of FIG. 3, wherein the passage of the cutting line at the beginning of the operation for forming the length of cutting line inside the grass cutting head of FIGS. 1 to 3.
Figure 3B:
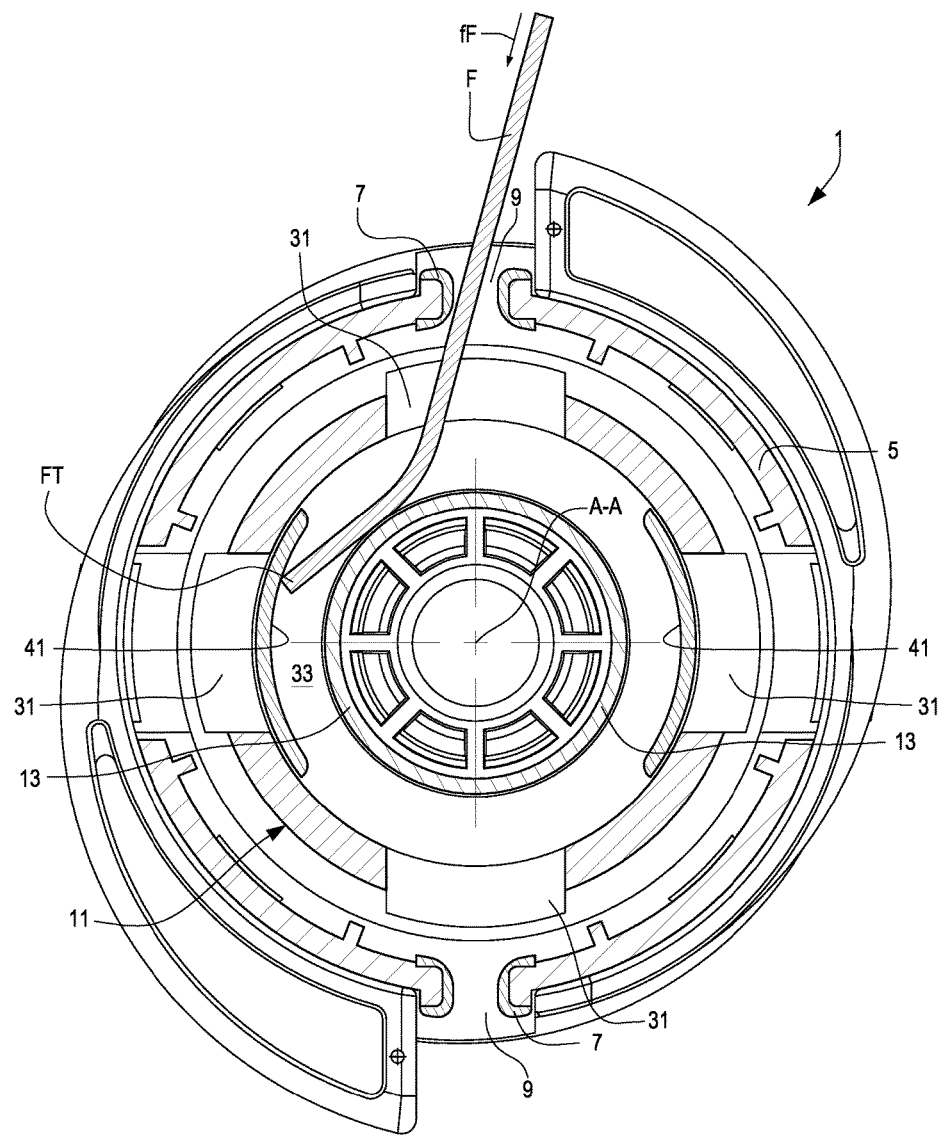
Figure 3C:
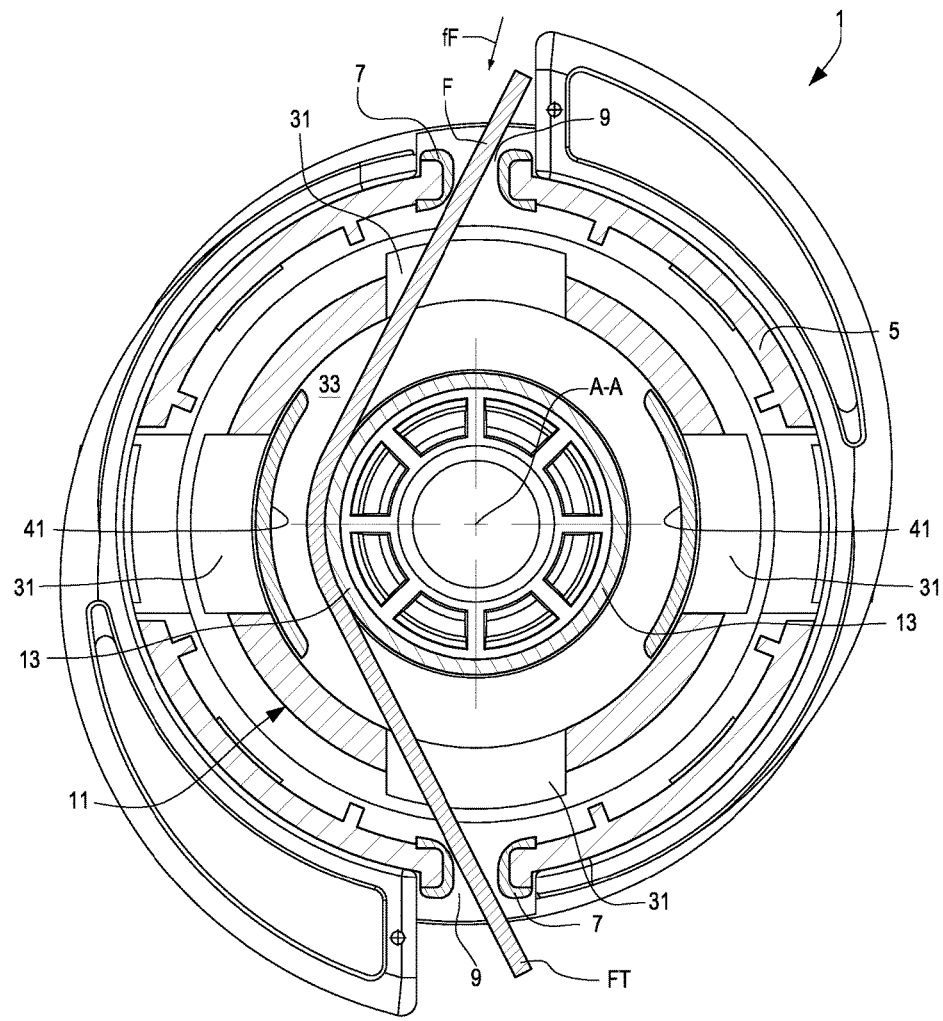

To facilitate guiding the cutting line F during the insertion through the grass cutting head 1, in the space 33 between the transverse wall 3B formed by the lower portion of the housing 3 and the lower surface of the flange 15, in some embodiments guiding projections for the cutting line may be integral with the transverse wall formed by the portion 3B of the housing 3, these guiding projections being shown in the embodiment of FIGS. 3A, 3B and 3C. In these figures, the projections are labeled 41. They have, for instance, an arched shape extending for an arch of approximately 60° in a position shifted by 90° with respect to the position of the bushings 7 forming the passage holes 9 for the cutting line F. The purpose of the guiding projections 41 is clearly apparent from the sequence of FIGS. 3A-3C. The end FT of the cutting line F that is inserted through the grass cutting head 1 according to arrow fF, may touch one or the other of the two guiding projections 41, as shown in FIG. 3B. When this occurs, the end FT of the cutting line F is deviated by the guiding projection 41 towards the passage hole 9 opposite to the hole through which the cutting line F has been inserted in the head 1.

In this way, the end FT of the cutting line F cannot accidentally enter the opening 31 provided in the spool 11 in a position located at 90° with respect to the opening 31, through which the cutting line F has been inserted.

Figure 10:
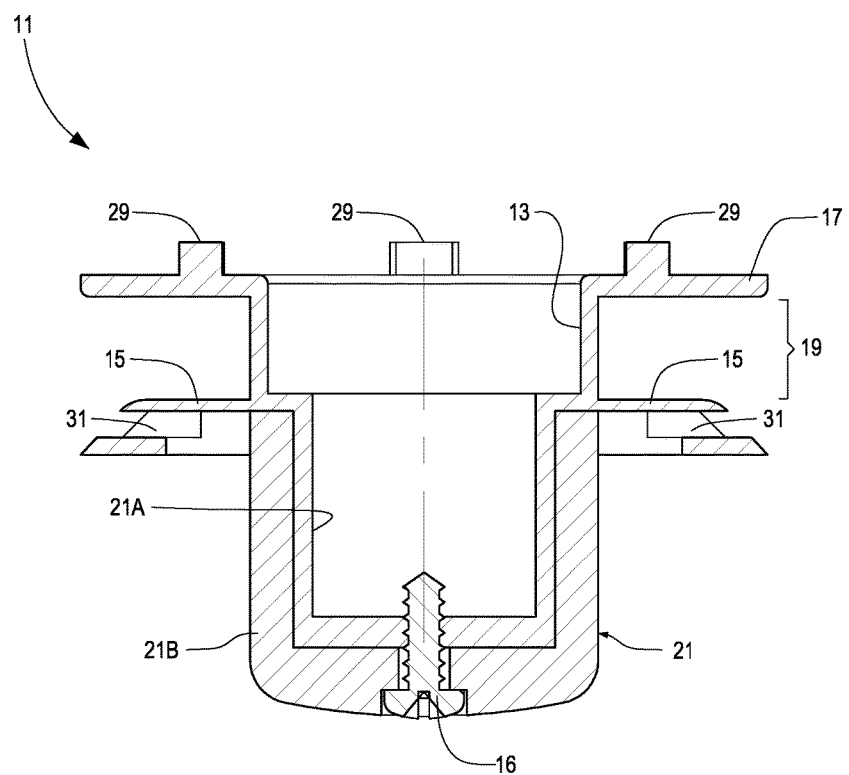
FIG. 10 shows a cross-section according to the longitudinal axis of a variant of embodiment of the spool of FIGS. 5-9.
Figure 11:
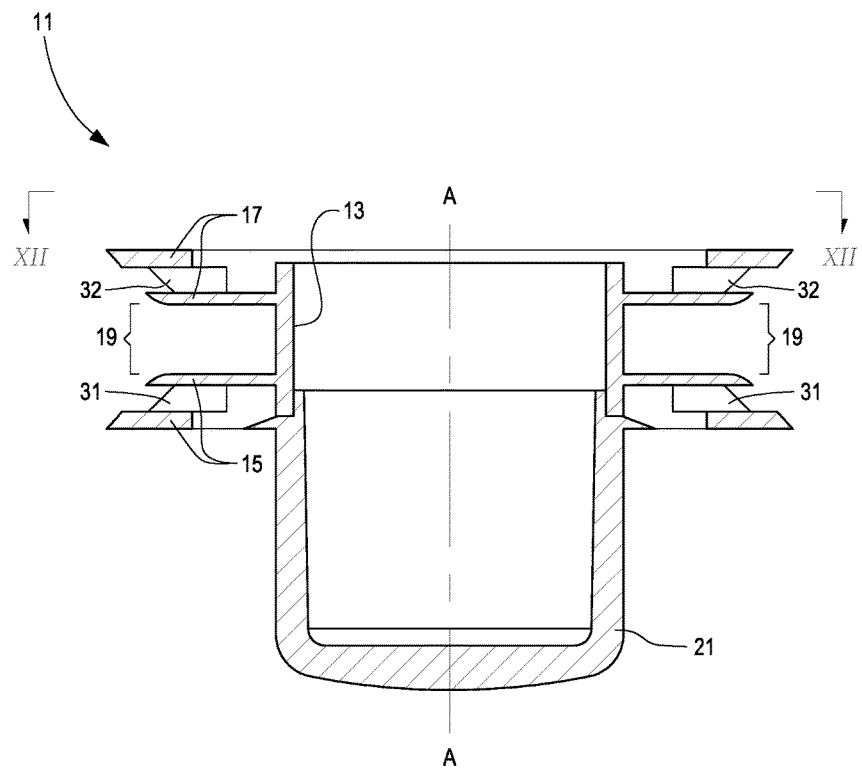
FIG. 11 shows a cross-section according to XI-XI of FIG. 12 of a further embodiment of the spool.
Figure 12:
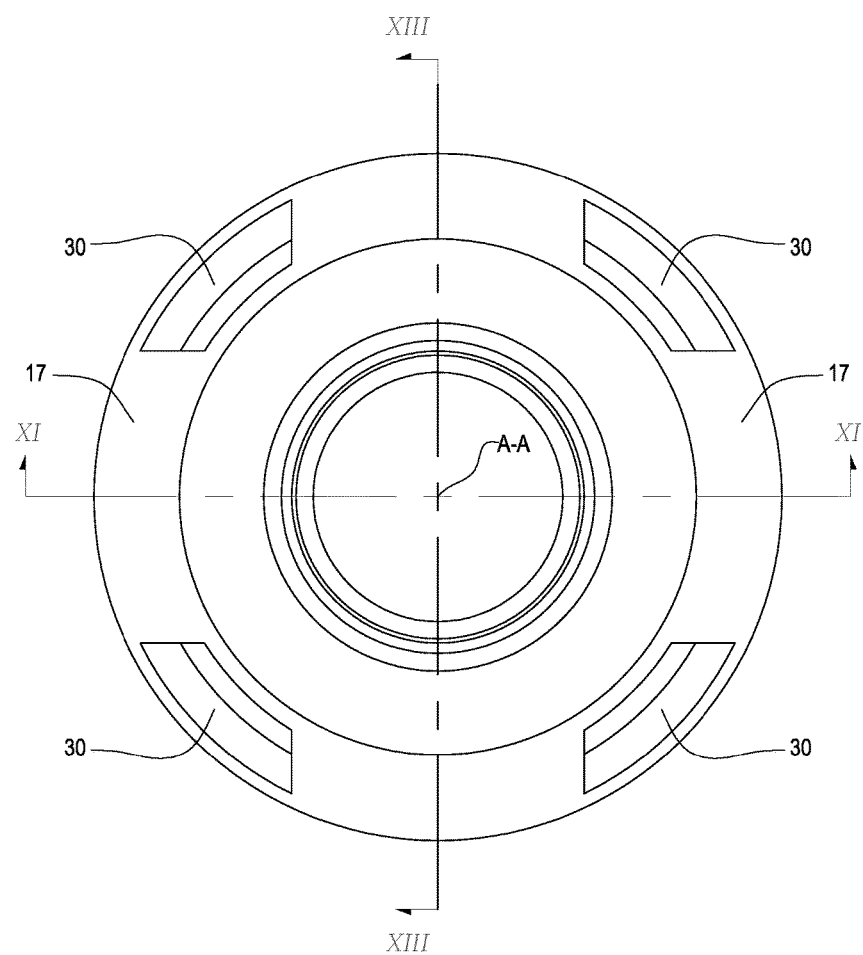
FIG. 12 is a section according to XII-XII of FIG. 11.
Figure 13:
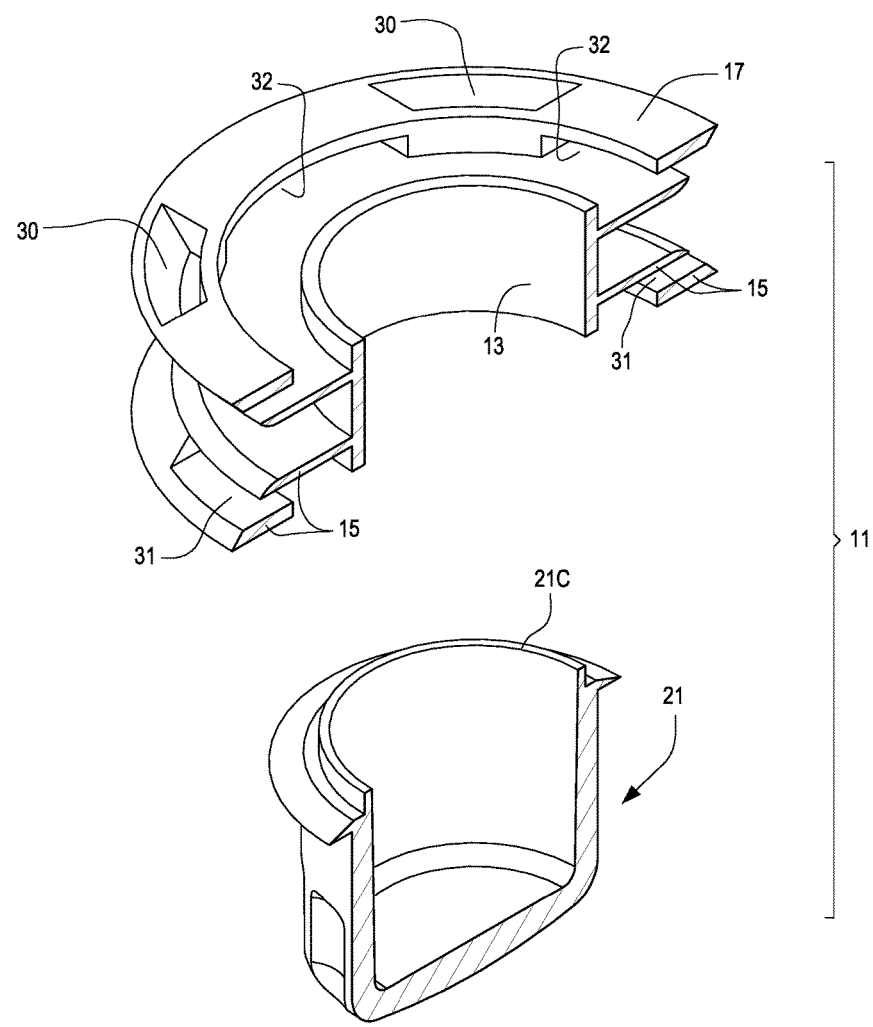
FIG. 13 is an isometric cross-section according to XIII-XIII of FIG. 12 with the components of the spool separated from one another.
Figure 14:
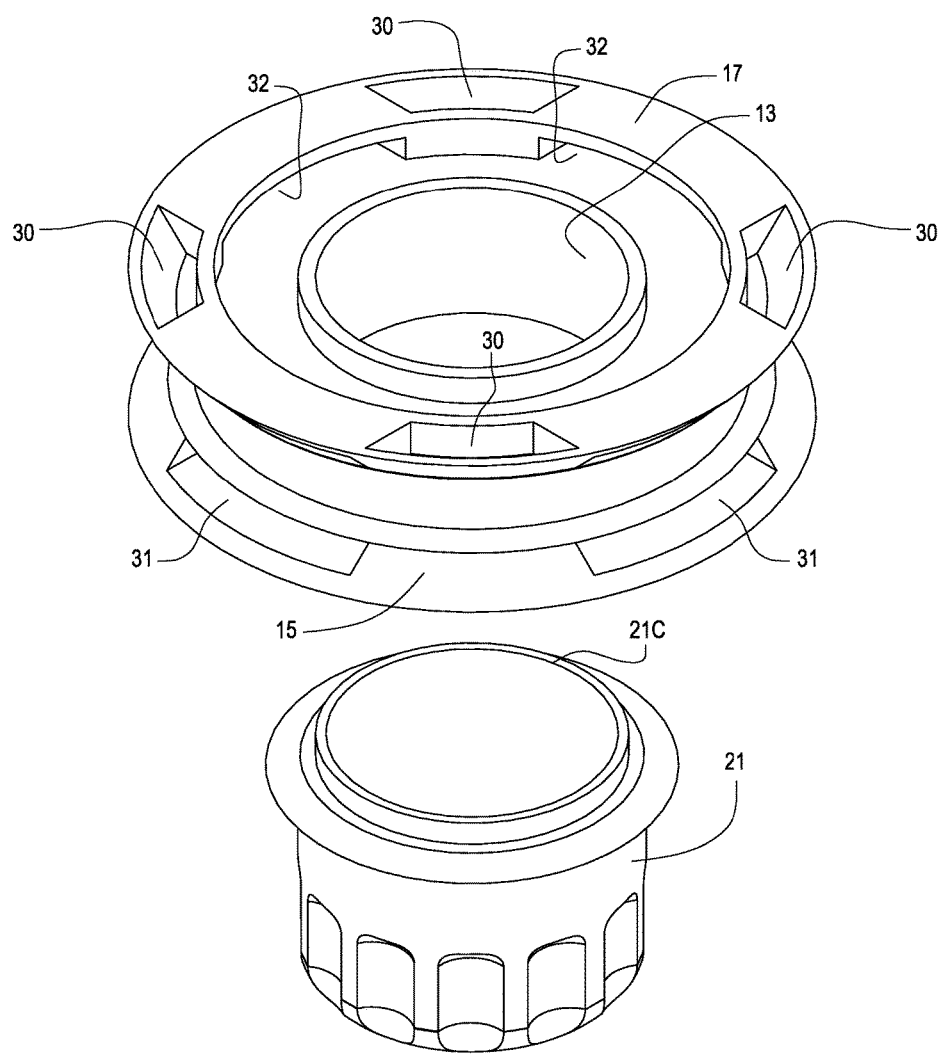
FIG. 14 shows an isometric view of the spool of FIGS. 11-13 with the components of the spool separated from one another.
Figure 15:
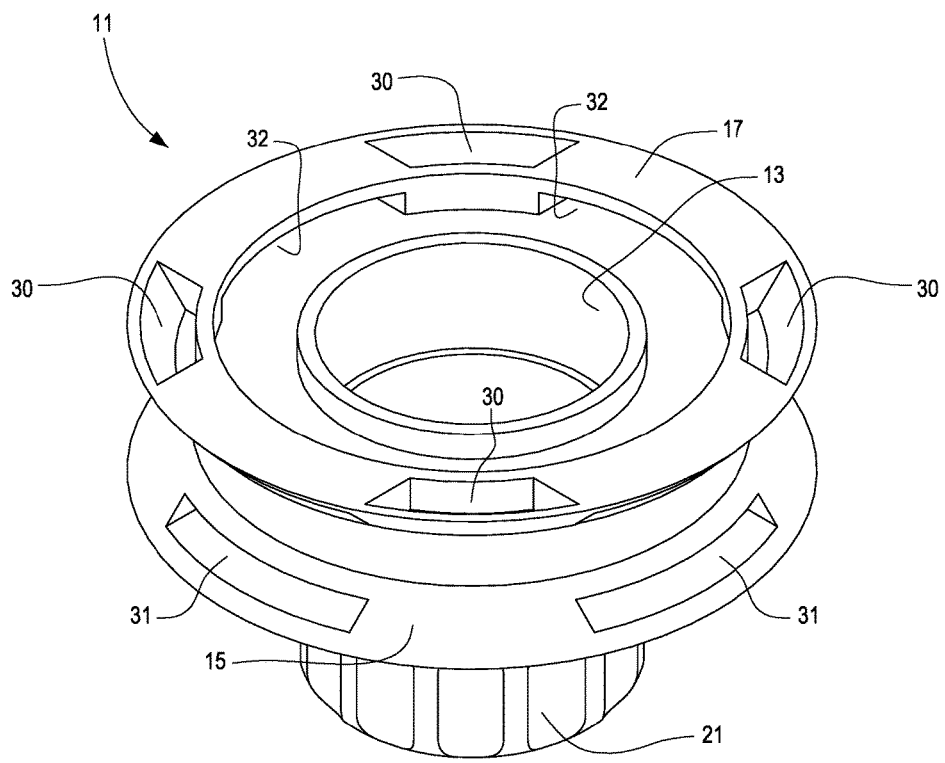
FIGS. 15 and 16 are isometric views from the top and the bottom of the spool of FIGS. 11-14 when mounted.
Figure 16:
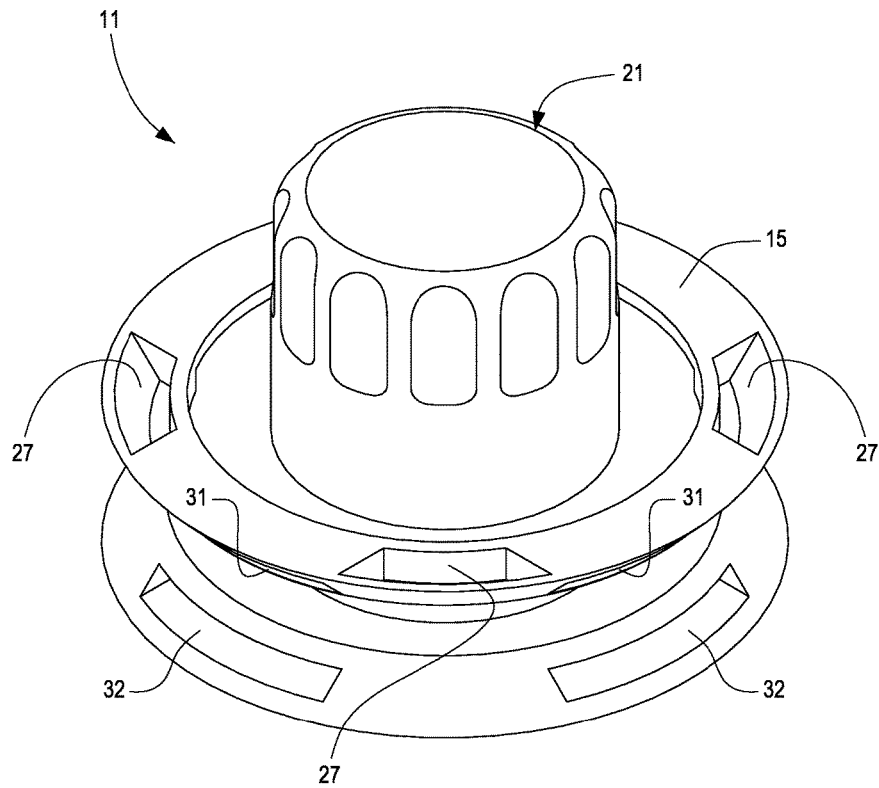
Figure 17:
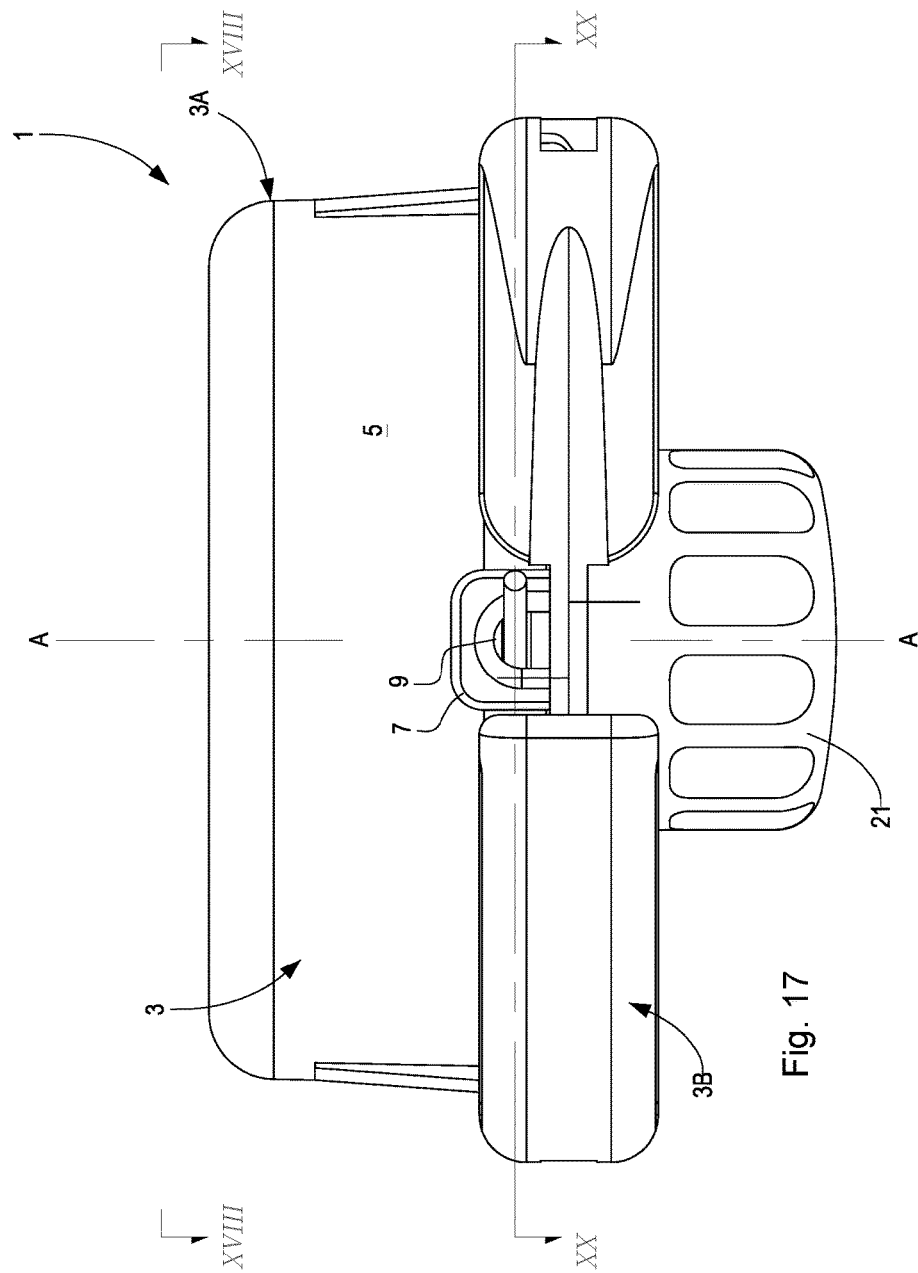
FIG. 17 is a side view of a further embodiment of a grass cutting head according to the invention.
Figure 18:
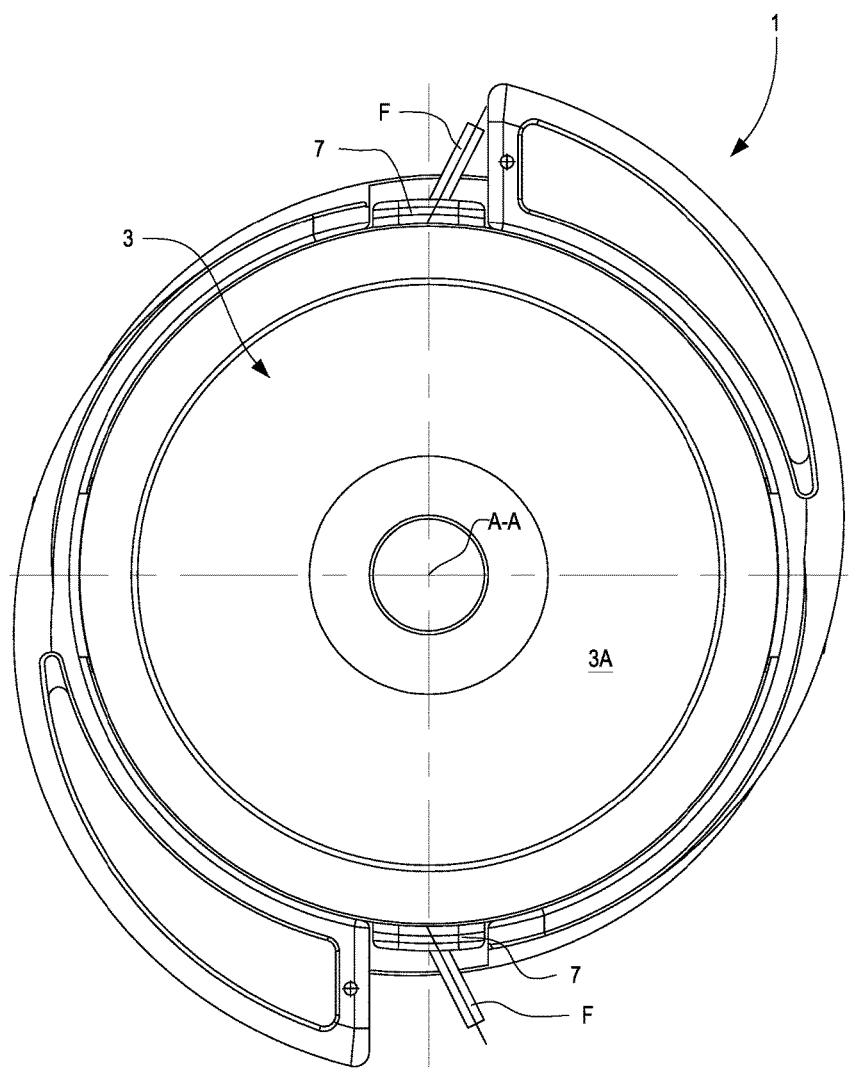
FIG. 18 is a plan view according to XVIII-XVIII in FIG. 17.
Figure 19:
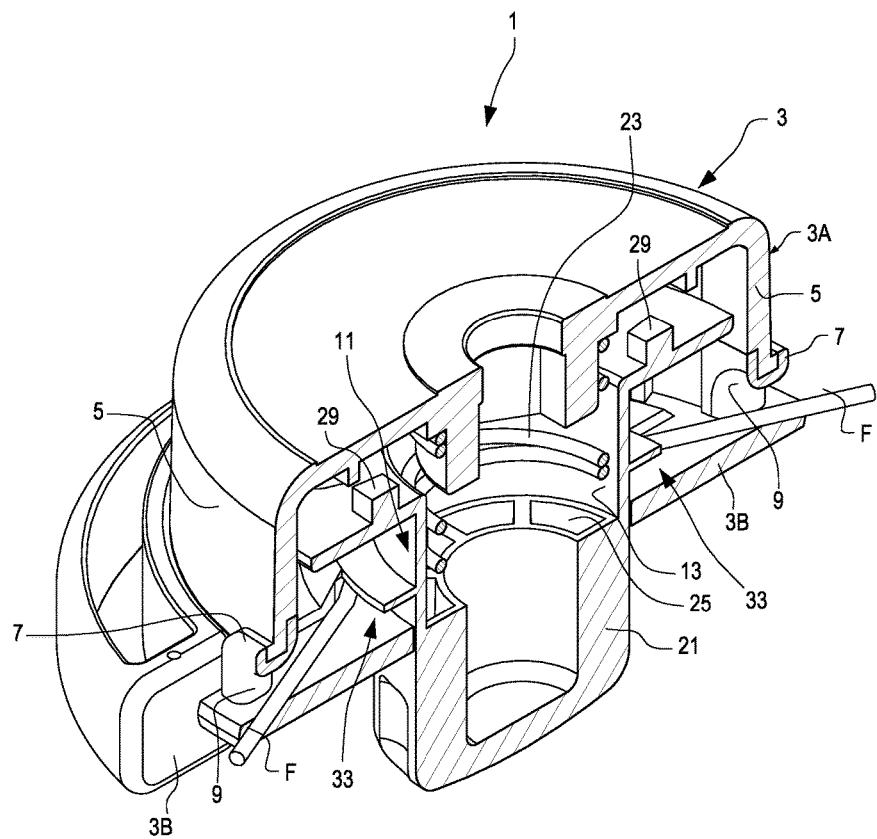
FIG. 19 is an isometric cross-section according to XIX-XIX of FIG. 18.

FIG. 10 shows an embodiment of the spool 11, modified with respect to that of FIGS. 5 to 9. The same reference numbers indicate the same or equivalent parts to those described with reference to the previous figures. In the embodiment of FIG. 10, the spool 11 has a knob 21 comprised of two portions 21A and 21B, connected to one another by means of a screw 16. The portion 21A is made in a single piece with the flange 15, the flange 17 and the axial body 13 of the spool 11. Vice-versa, the portion 21B of the knob 21 may be manufactured, for instance, in a separate molding phase, and assembled with the portion 21A in a subsequent step after molding.

FIGS. 11 to 16 show a further modified embodiment of a spool 11 that can be used in the grass cutting head of FIGS. 1 to 4. The same reference numbers indicate identical or equivalent parts to those already described above. In this embodiment, the spool 11 has again a first flange 15 and a second flange 17, between which the annular space 19 is defined where the turns of cutting line F are formed. The spool 11 of FIGS. 11 to 16 has again an axial body 13 and a knob 21 coaxial with the axial body 13.

In this embodiment, the knob 21 is formed as a piece separated from the remaining part of the spool 11, and may be applied to the axial body 13 with a snap annular projection 21C (FIGS. 13 and 14) or in any other way. The two components forming the spool 11 may be joined by gluing, welding or in any other suitable permanent way, but also a reversible coupling is possible, for example a snap coupling.

In some embodiments, as shown in FIGS. 11 to 16, the two flanges 15, 17 are similar to one another, i.e. with openings for the passage of the cutting line provided in both flanges 15, 17. The openings of the flange 15 are indicated again with 31, whilst the corresponding openings provided in the flange 17 are indicated with 32.

In the embodiment illustrated in FIGS. 11 to 16, the openings 31, 32 are distributed in two pairs of diametrically opposed openings on each flange 15, 17, and may be provided in a truncated-conical portion of the respective flange 15, 17.

Similarly to what has been already described with reference to FIGS. 5 to 9, recesses 27 are provided on the lower surface of the flange 15, forming abutments for the locking teeth 28 provided on the transverse wall 3B. The locking teeth 28 mesh with the recesses 27 formed in the lower surface of the flange 15, so as to angularly lock the spool 11 with respect to the housing 3 of the grass cutting head 1. In the embodiment of FIGS. 11 to 16, similar recesses 30 are provided also on the upper surface of the flange 17 between the through openings 32.

In this way, the cutting line F may pass indifferently above the flange 17 or below the flange 15, i.e. the spool 11 may be inserted in a grass cutting head 1 in any one of the two positions, by rotating the spool by 180° around an axis orthogonal to the axis A-A.

FIGS. 17 to 20 show a further embodiment of a grass cutting head 1 according to the invention, inside which a spool may be housed, shaped for example as illustrated in FIGS. 21 to 25. The same reference numbers indicate the same or equivalent parts to those of the previous embodiments, which will be not described in detail.

Figure 20:
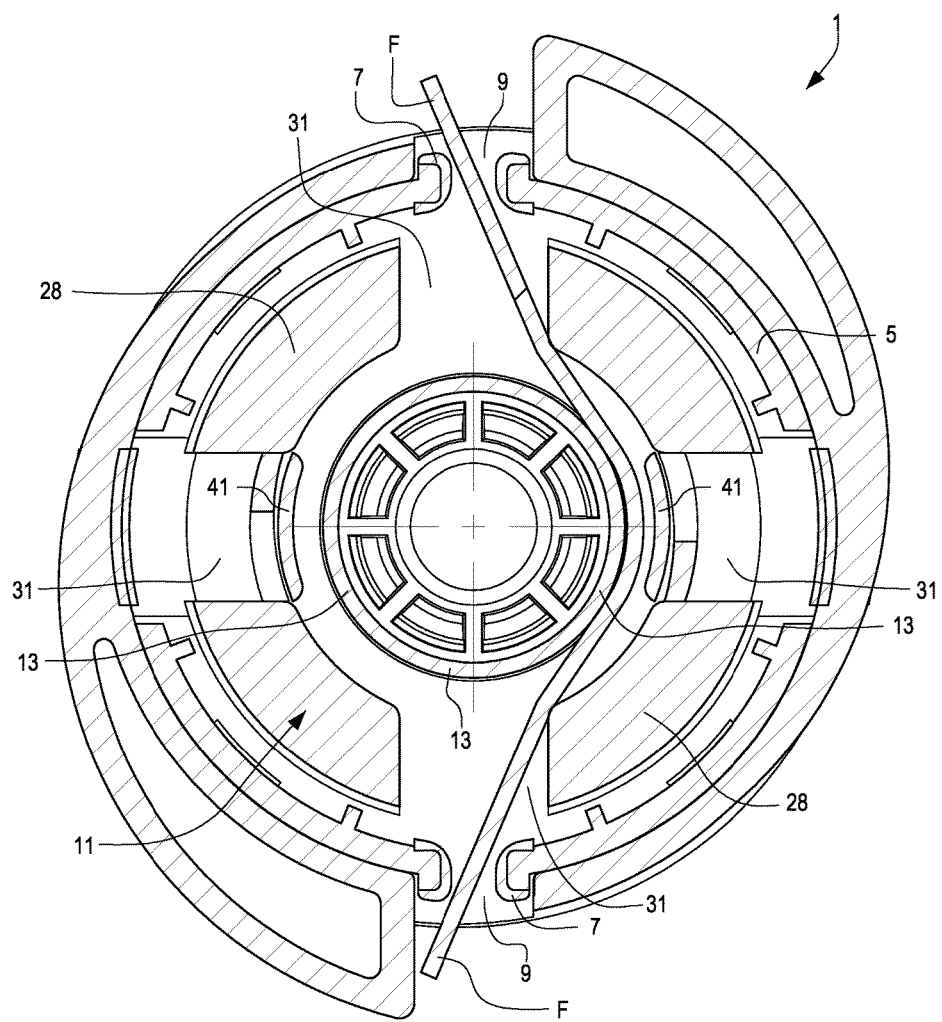
FIG. 20 is a cross-section according to XX-XX of FIG. 17.
Figure 21:
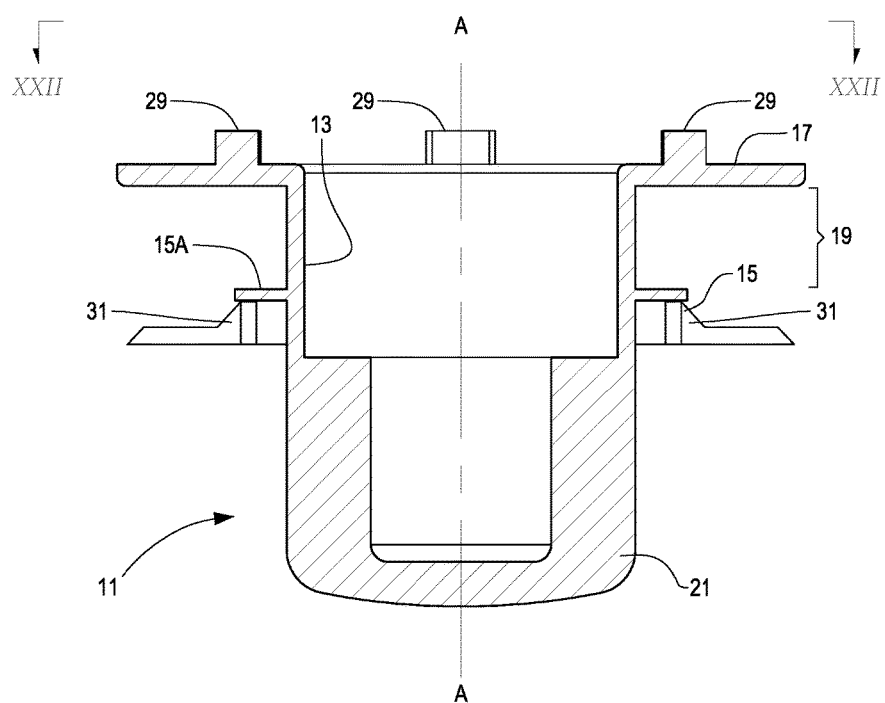
FIG. 21 shows a cross-section according to XXI-XXI of FIG. 22 of a spool that can be used with the head of FIGS. 17-20.
Figure 22:
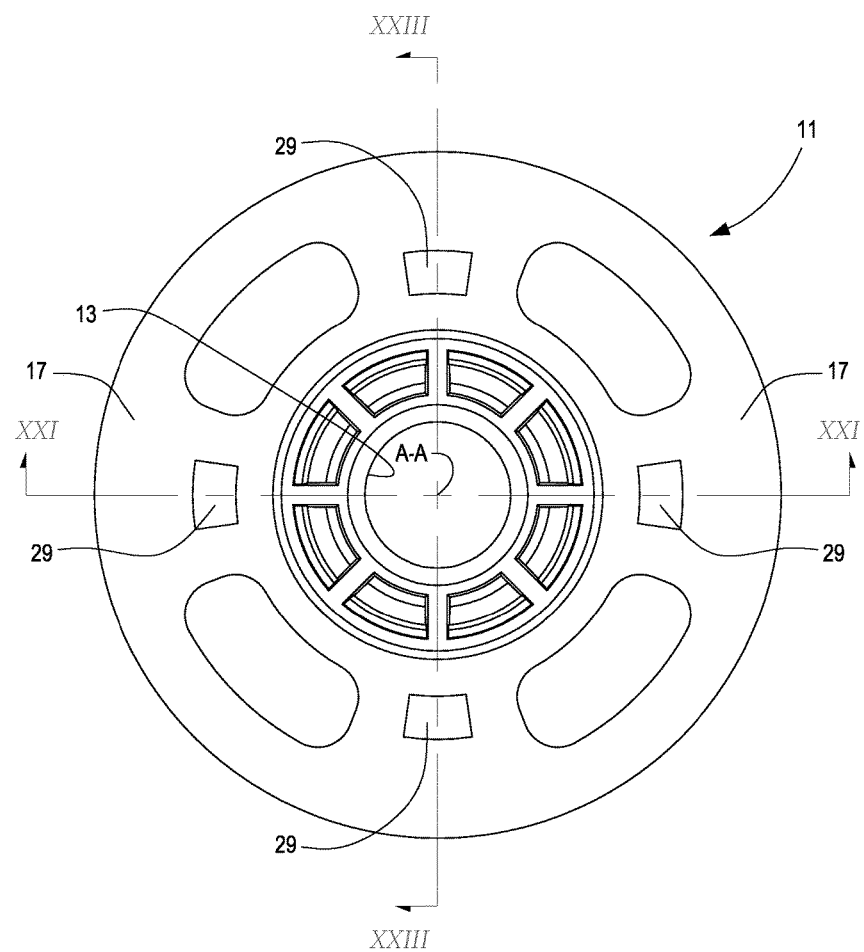
FIG. 22 shows a view according to XXII-XXII in FIG. 21.
Figure 23:
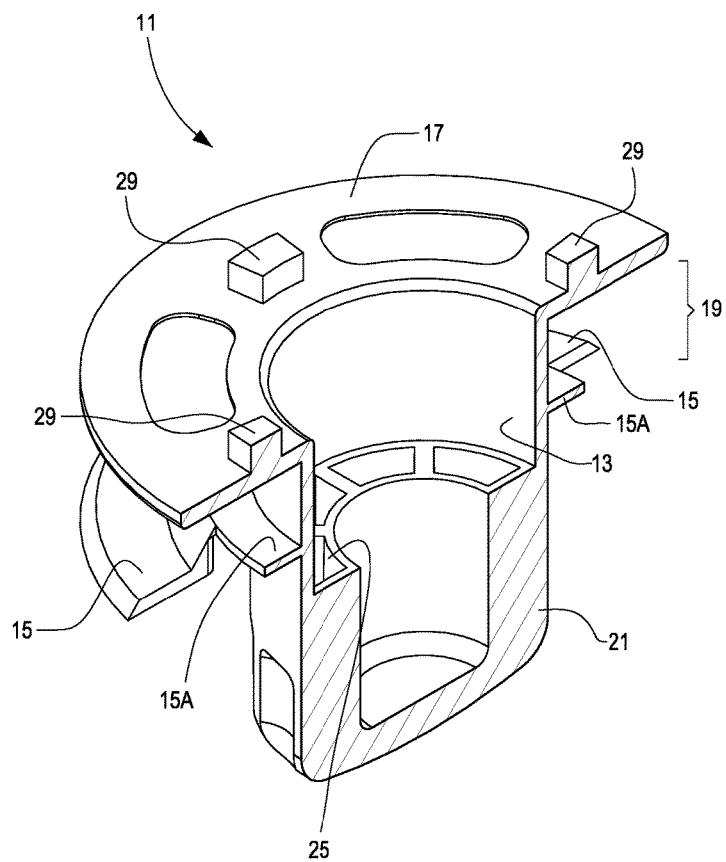
FIG. 23 is an isometric cross-section according to XXIII-XXIII of FIG. 22.
Figure 24:
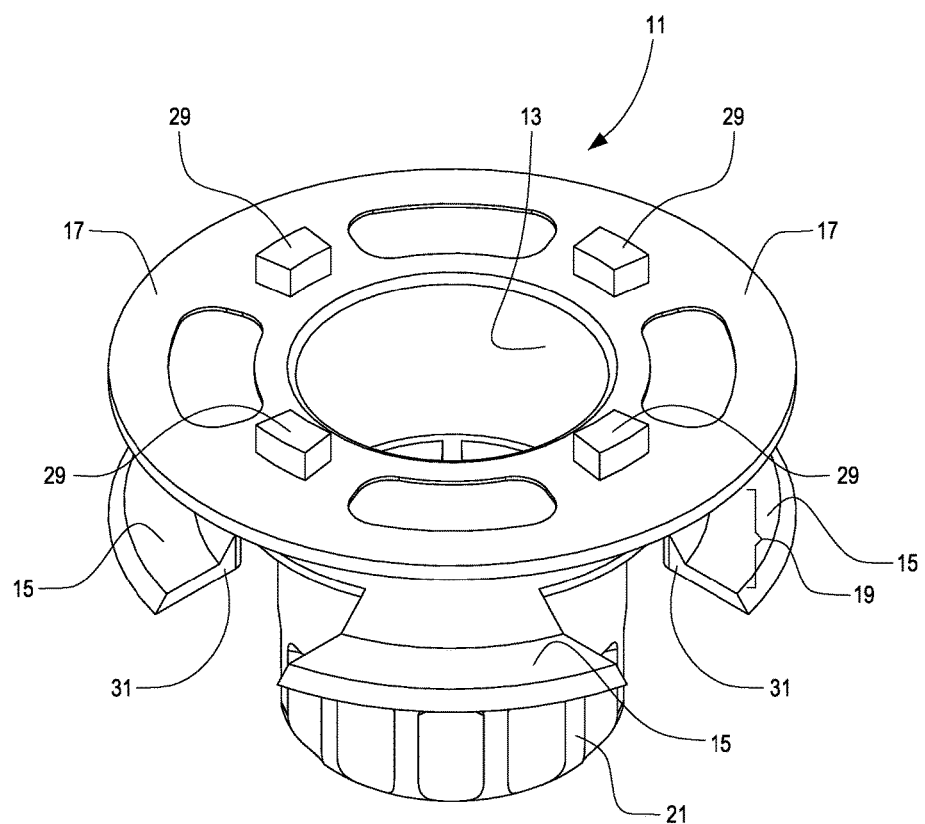
FIGS. 24 and 25 are isometric views from the top and the bottom of the spool of FIGS. 1-23.
Figure 25:
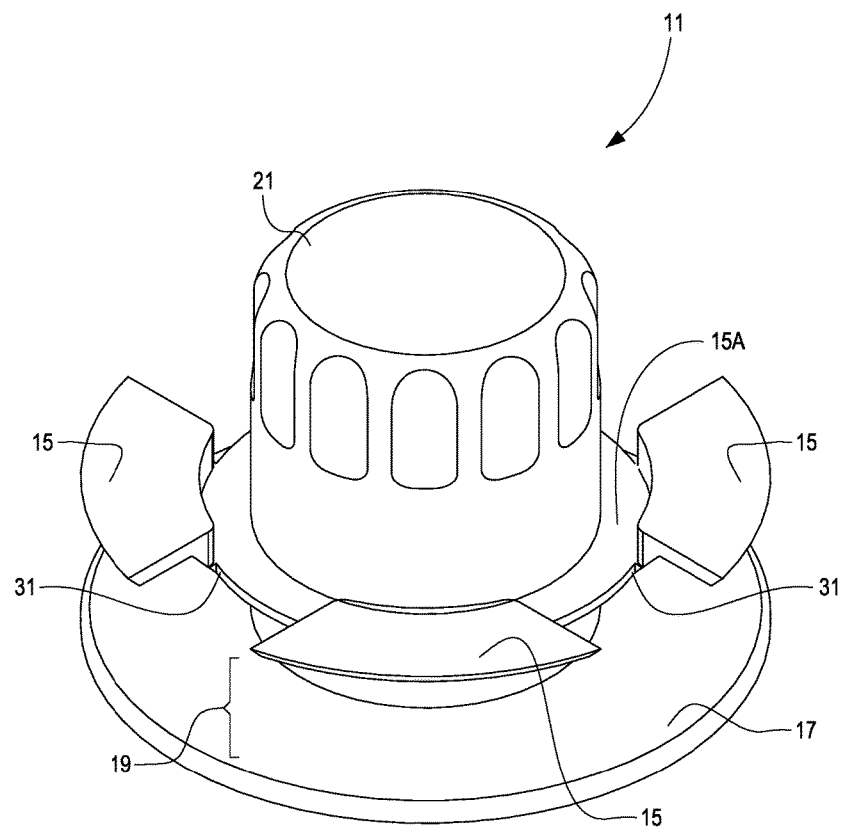

FIG. 20 shows in particular a pair of guiding projections 41 that, similarly to the projections 41 of FIGS. 3A to 3C, are useful to guide the end FT of the cutting line F when it passes through the inner space of the head 1, moving between the flange 15 of the spool 11 and the transverse wall formed by the portion 3B of the housing 3.

As shown in detail in FIGS. 21 to 25, the spool 11 differs from the spool illustrated in FIGS. 5 to 9 because the openings 31 are not provided in the form of windows in the truncated-conical perimeter edge of the lower flange 15, but like notches provided in the flange 15, this latter being thus reduced (see in particular FIG. 25) to a group of four portions of flange 15 spaced from one another by the hollow areas formed by the openings 31. The portions 15 intercalated between the openings 31 are joined to a continuous annular projection 15A surrounding the axial body 13 of the spool 11.

The operation of the grass cutting head of FIGS. 17 to 20 and of the corresponding spool of FIGS. 21 to 25 is substantially the same as already described with reference to the previous figures.

Figure 26:
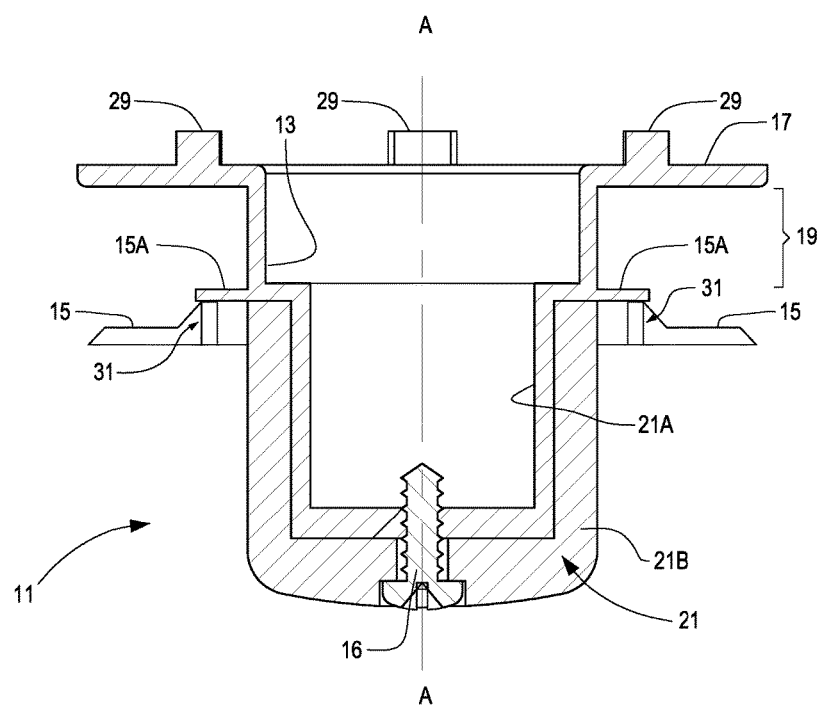
FIG. 26 shows a cross-section analogous to that of FIG. 21 of a variant of embodiment of the spool that can be used in the grass cutting head of FIGS. 17-20.
Figure 27:
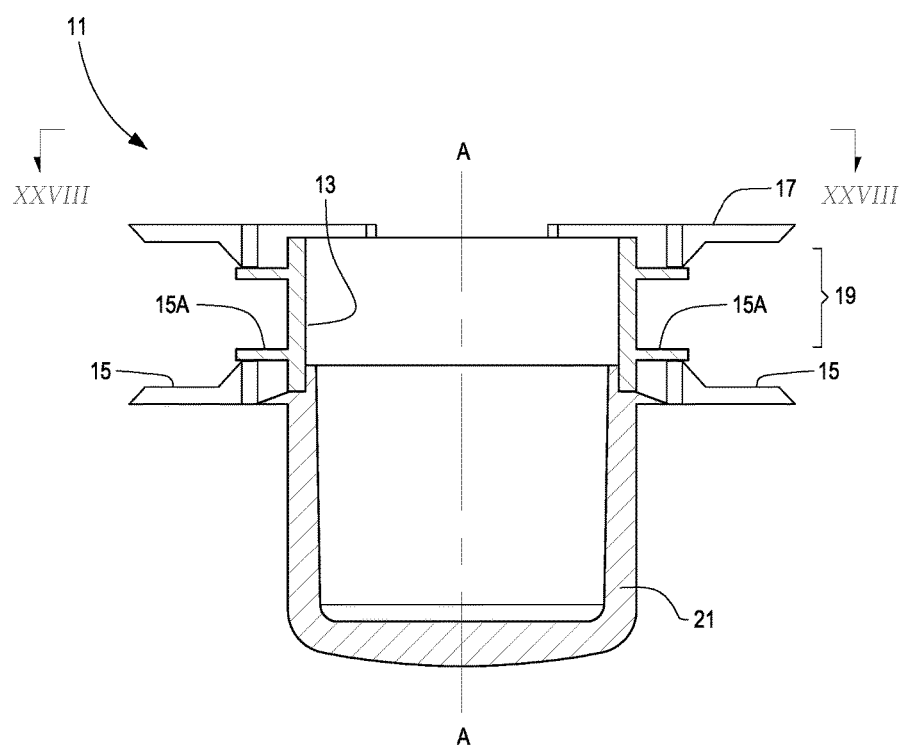
FIG. 27 shows a cross-section according to XXVII-XXVII of FIG. 28 of a variant of embodiment of the spool that can be used in the head of FIGS. 17-20.
Figure 28:
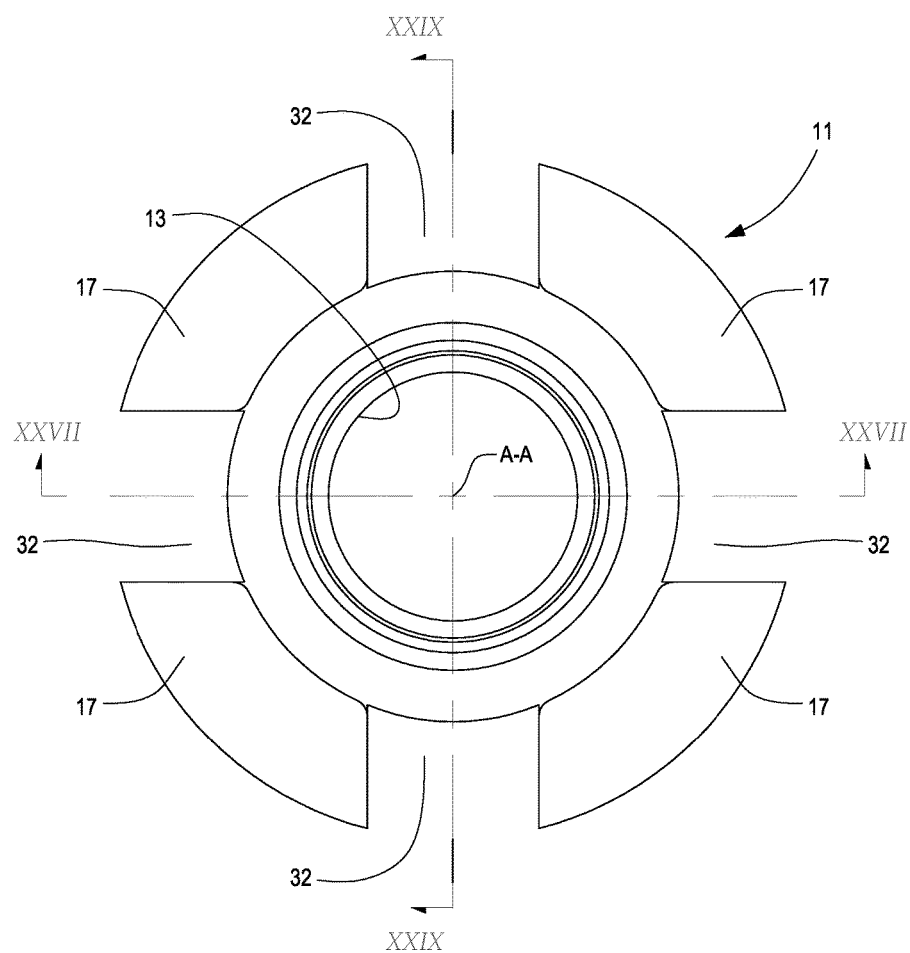
FIG. 28 is a plan view according to XXVIII-XXVIII in FIG. 27.

FIG. 26 shows a modified embodiment of the spool of FIGS. 21 to 25. In this embodiment, the spool 11 is comprised of two parts, similarly to what has been already described with reference to the embodiment of FIG. 10. The knob 21 is comprised of two portions 21A and 21B joined to one another by means of a fastening screw 16. The other parts of the spool 11 of FIG. 26 are substantially equal to those already described with reference to the previous figures.

FIGS. 27 to 32 show a modified embodiment of the spool of FIGS. 21 to 25, wherein the flanges 15 and 17 of the spool 11 are substantially mirror-like, each having openings indicated with 31 and 32. On both the flanges 15, 17, the openings are formed by notches which interrupt the circular perimeter edge of the two flanges. The flanges 15, 17 are thus subdivided into portions joined along an annular projection 15A, 17A.

Moreover, in some embodiments the spool of FIGS. 27 to 32 may be formed by two parts, wherein the knob 31 is separated with respect to the remaining part of the spool, in a way substantially equivalent to what already described with reference to the embodiment of FIGS. 11 to 16. In this way, the spool may be also used without the knob 21, when the configuration of the grass cutting head 1 so requires.

Figure 29:
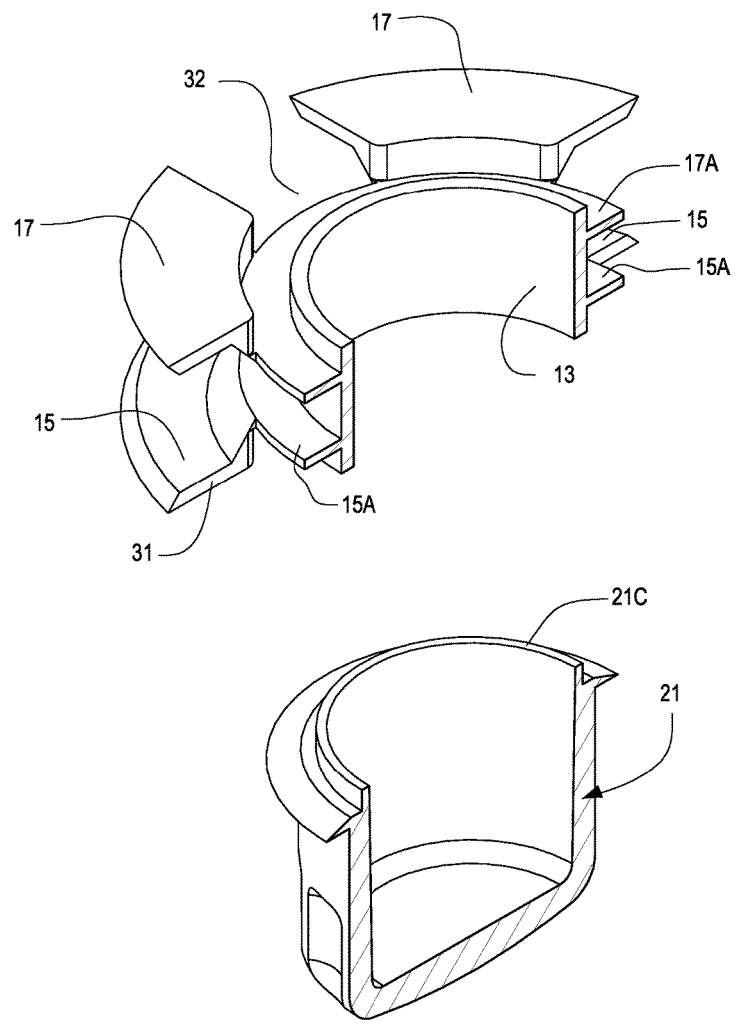
FIG. 29 shows an isometric cross-section according to XXIX-XXIX of FIG. 28 with the components of the spool separated from one another.
Figure 30:
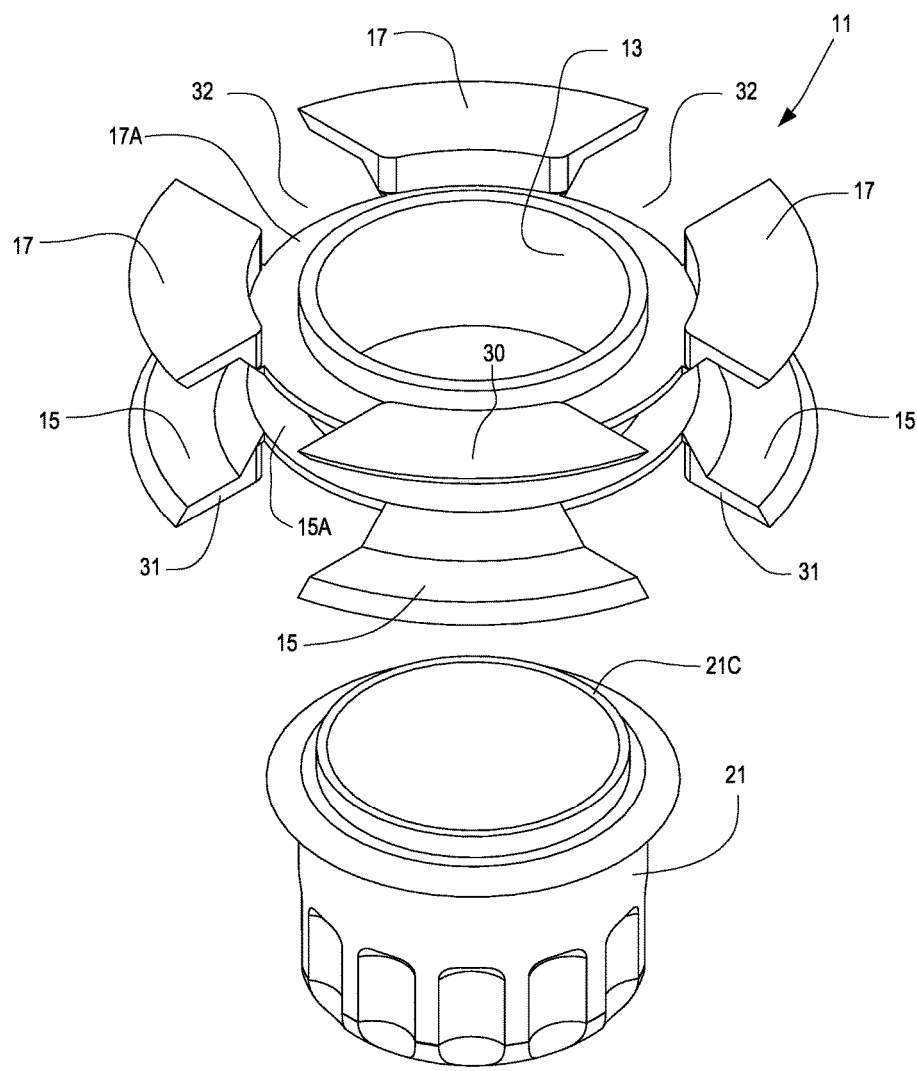
FIG. 30 is a whole isometric view of the same spool with the components separated from one another.
Figure 31:
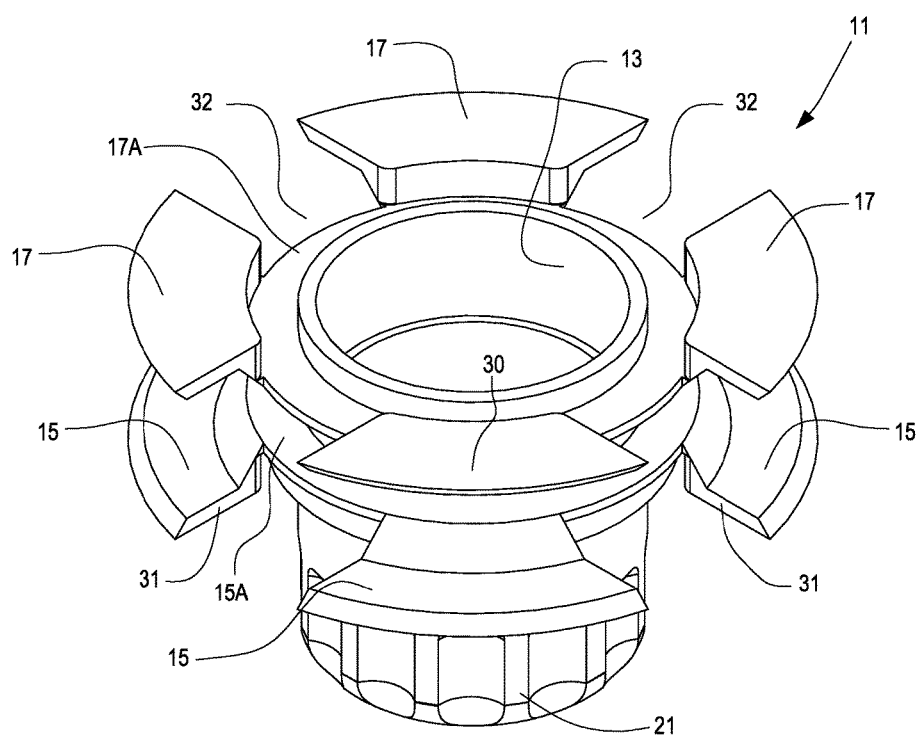
FIGS. 31 and 32 are isometric views from the top and the bottom of the spool of FIGS. 27-30 when mounted.
Figure 32:
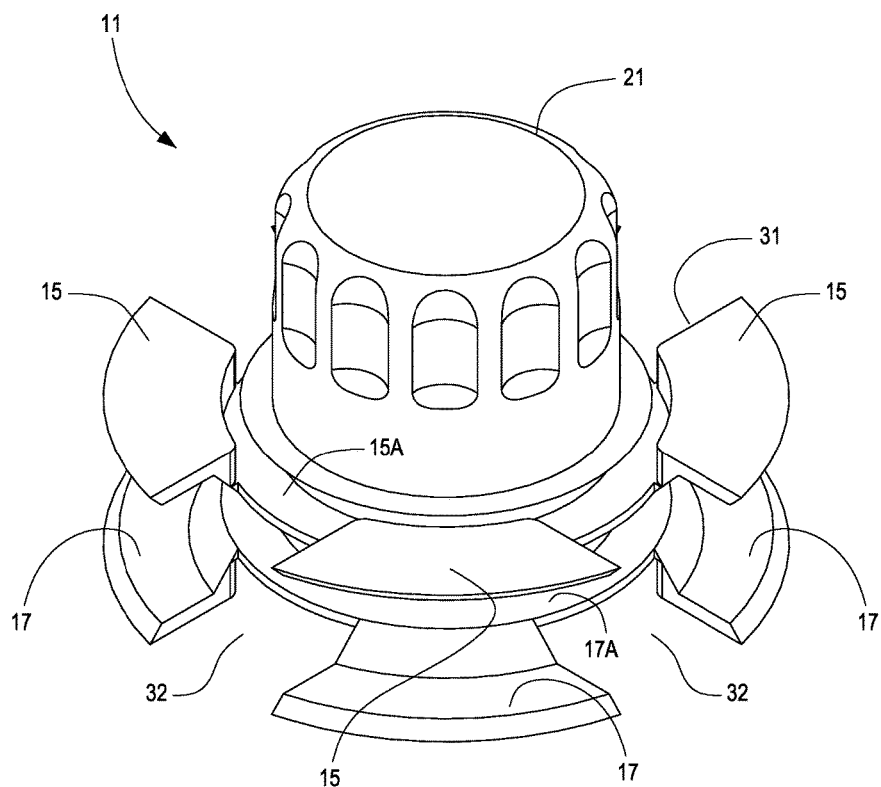
Figure 33:
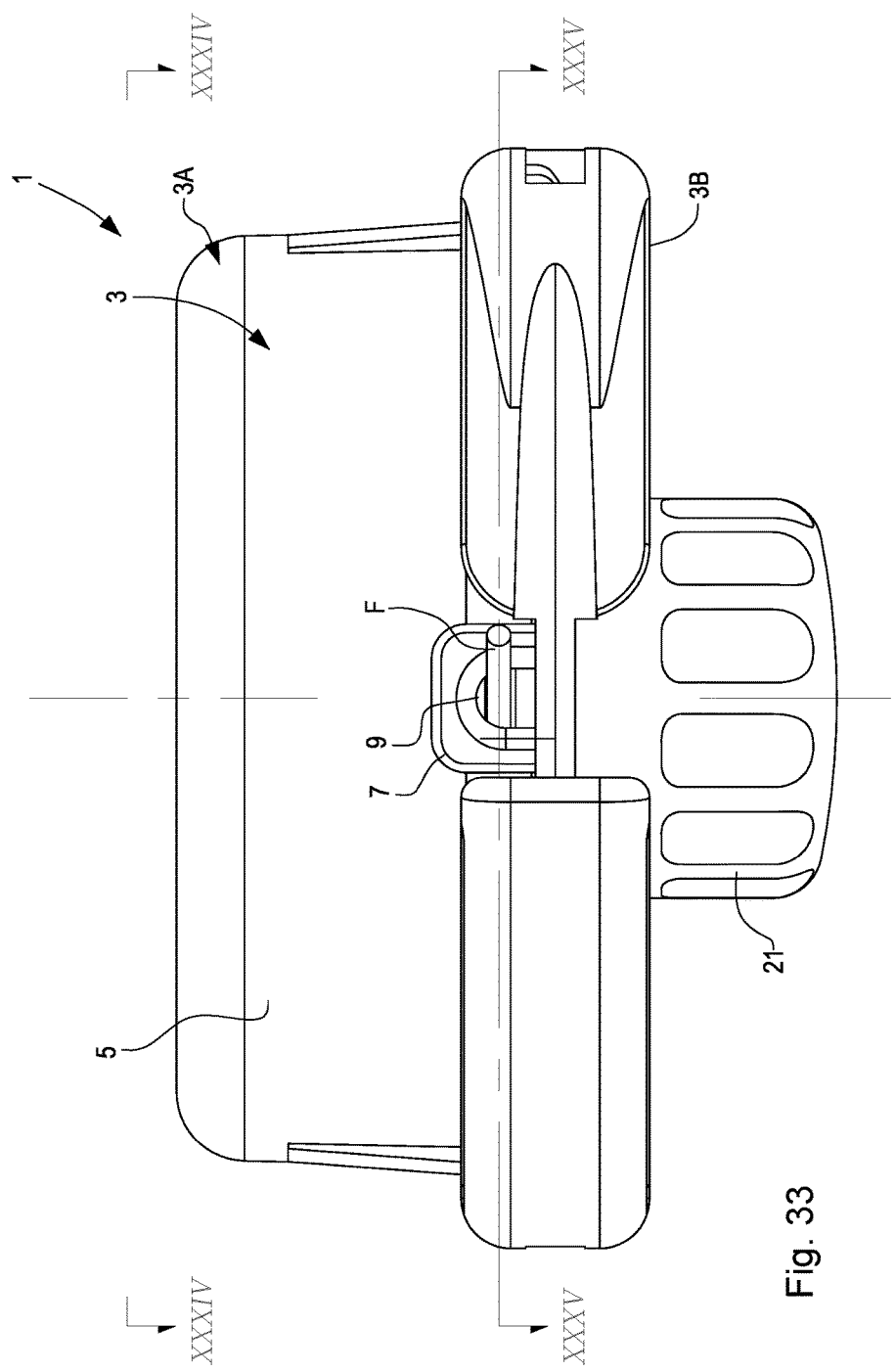
FIG. 33 is a side view of a further embodiment of a grass cutting head according to the invention.
Figure 34:
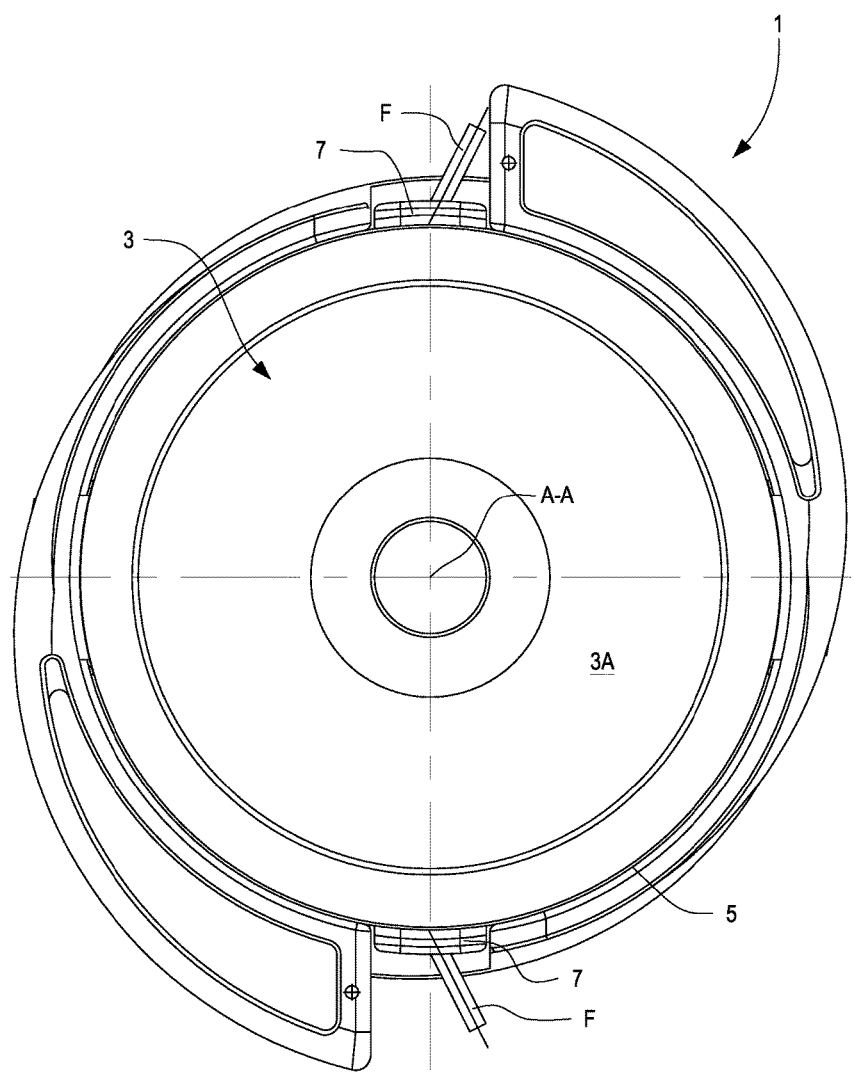
FIG. 34 is a view according to XXXIV-XXXIV of FIG. 33.
Figure 35:
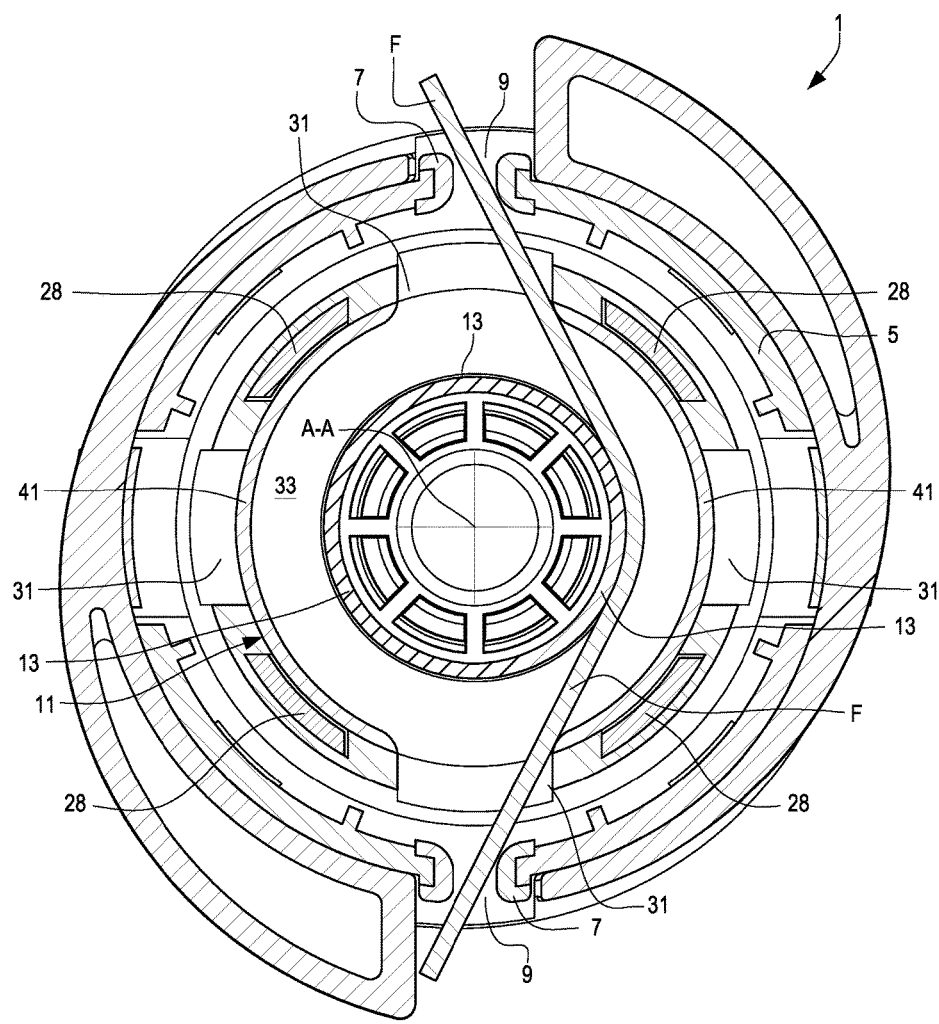
FIG. 35 is a view according to XXXV-XXXV of FIG. 33.
Figure 36:
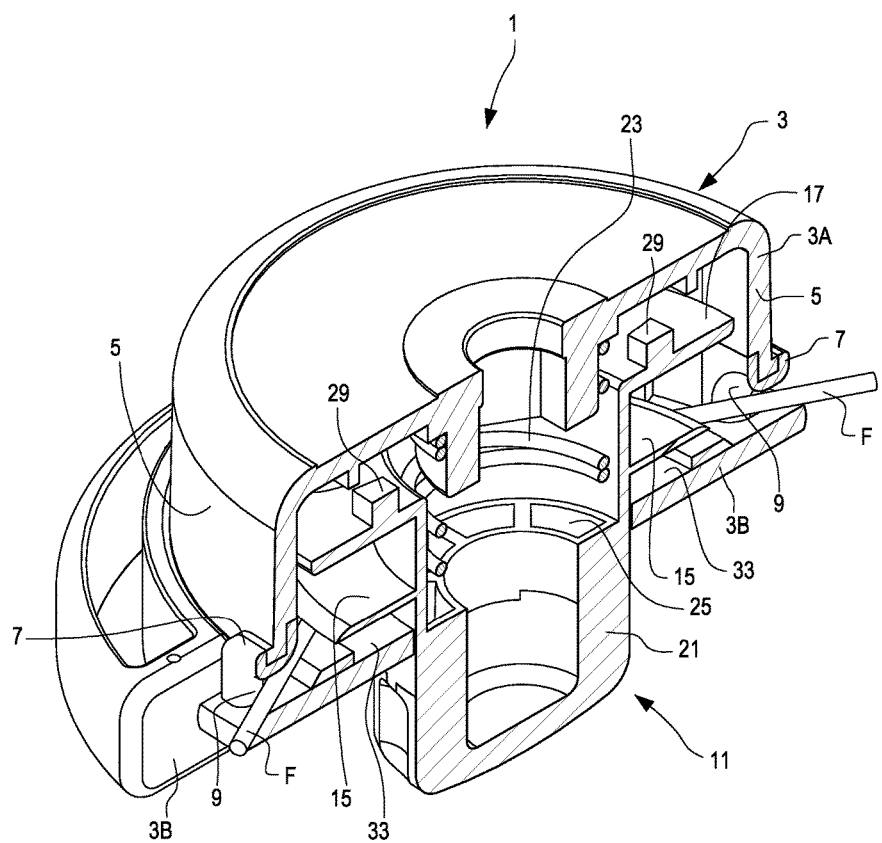
FIG. 36 is an isometric cross-section according to XXXVI-XXXVI of FIG. 34.

FIG. 29 shows the two parts of the spool 11, separated from one another. The coupling between the knob 21 and the part of spool 11 constituted by the axial body 13 and the interrupted flanges 15 and 17 may be reversible, with a snap coupling. or not reversible, for instance by means of gluing or welding.

FIGS. 33 to 36 show a modified embodiment of the grass cutting head. The same reference numbers indicate the same or equivalent parts to those of the previous embodiments, which will not be described again.

Figure 37:
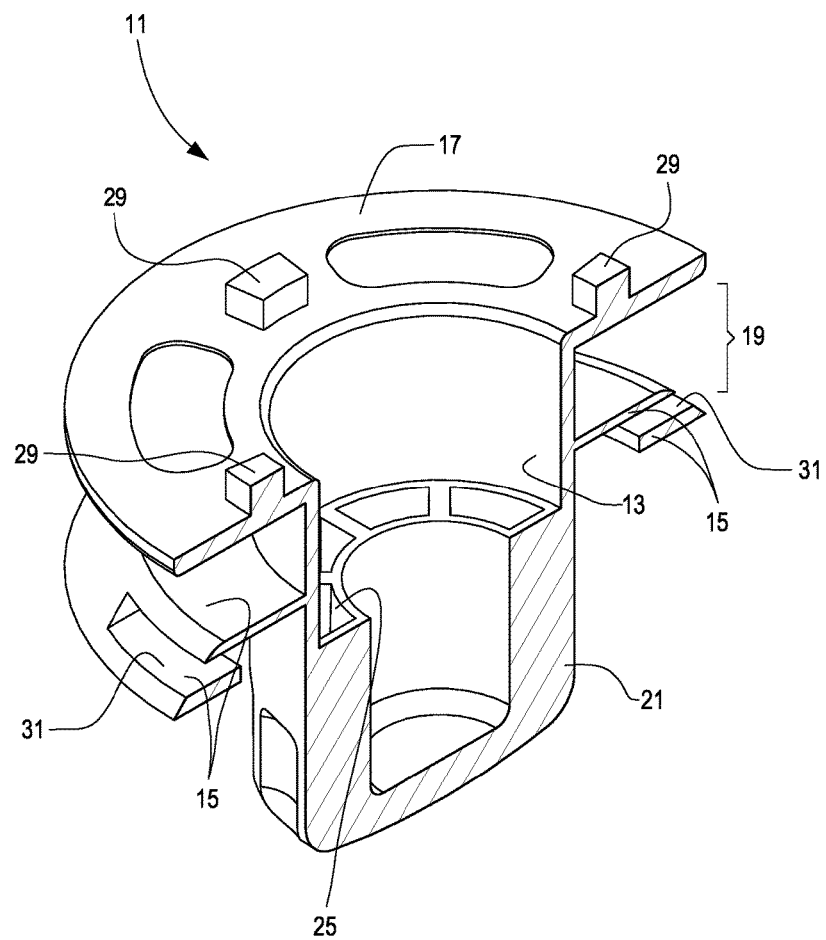
FIGS. 37, 38 and 39 show respectively an isometric cross-section, an isometric view from the top and an isometric view from the bottom of a spool that can be used with the grass cutting head of FIGS. 33-36.
Figure 38:
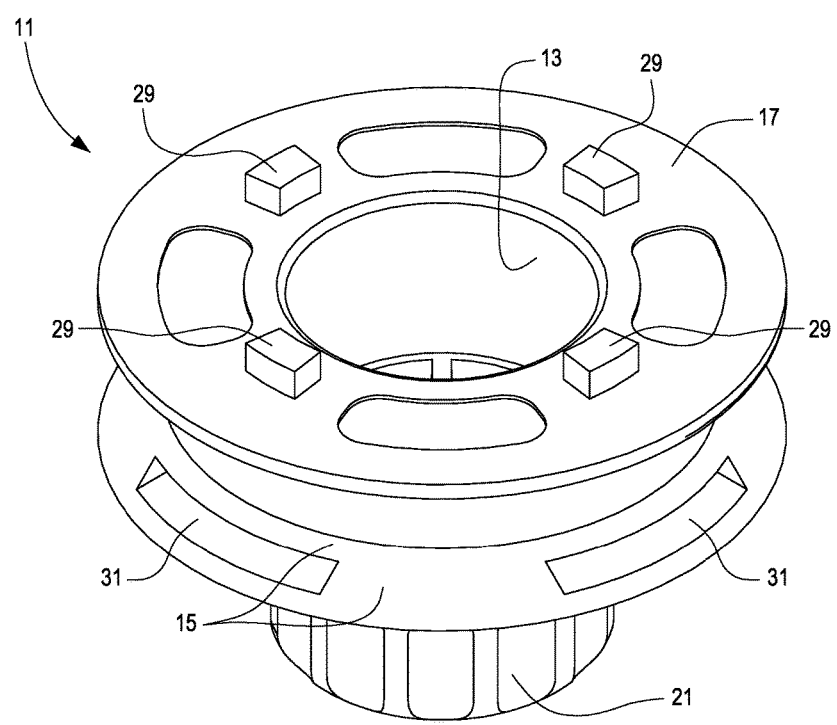
Figure 39:
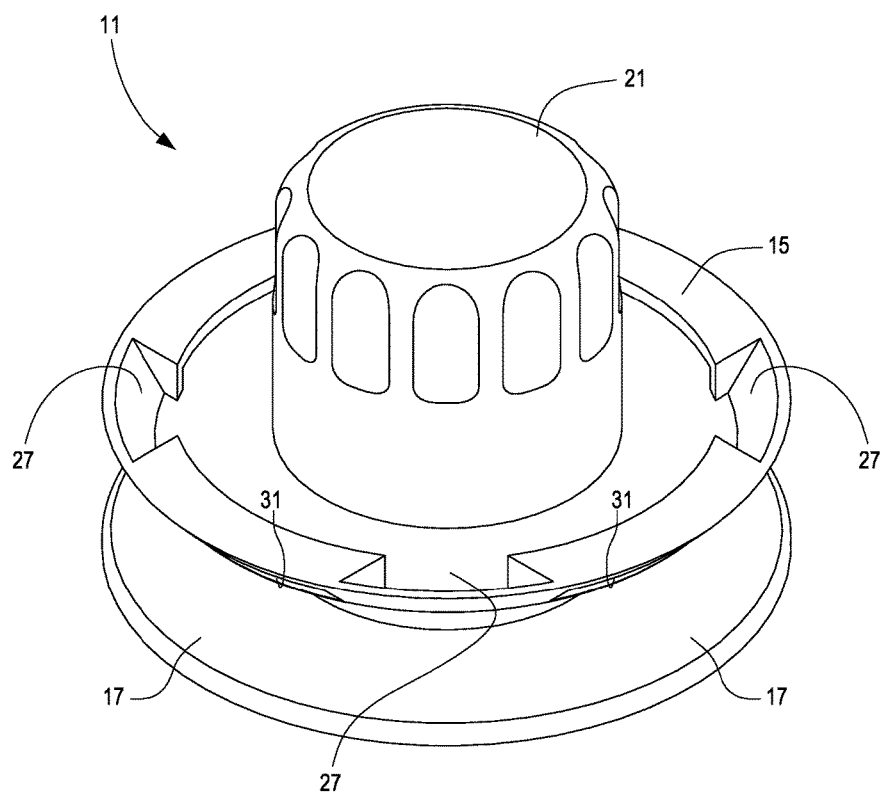

FIGS. 37, 38 and 39 show isometric views of the spool 11, which can be housed in the grass cutting head 1 of FIGS. 33 to 36. The spool of FIGS. 37 to 39 differs from the spool described and illustrated with reference to FIGS. 5 to 8 in the different shape of the lower surface of the first flange 15, as shown in particular in FIG. 39. In this embodiment, on the lower surface of the flange 15, between the openings 31 provided in the flange 15, marks or depressions 27 are provided, having the same function as the recesses 27 described with reference to the previous figures. The marks or depressions 27 are opened towards the axis A-A of the spool 11, and co-act with locking teeth provided on the transverse wall constituted by the portion 3B of the housing 3, similarly to what already described above.

Apart from that, the structure and function of the heads of FIGS. 33 to 36 and the respective spool of FIGS. 37 to 39 are substantially the same as those already described above.

Figure 40:
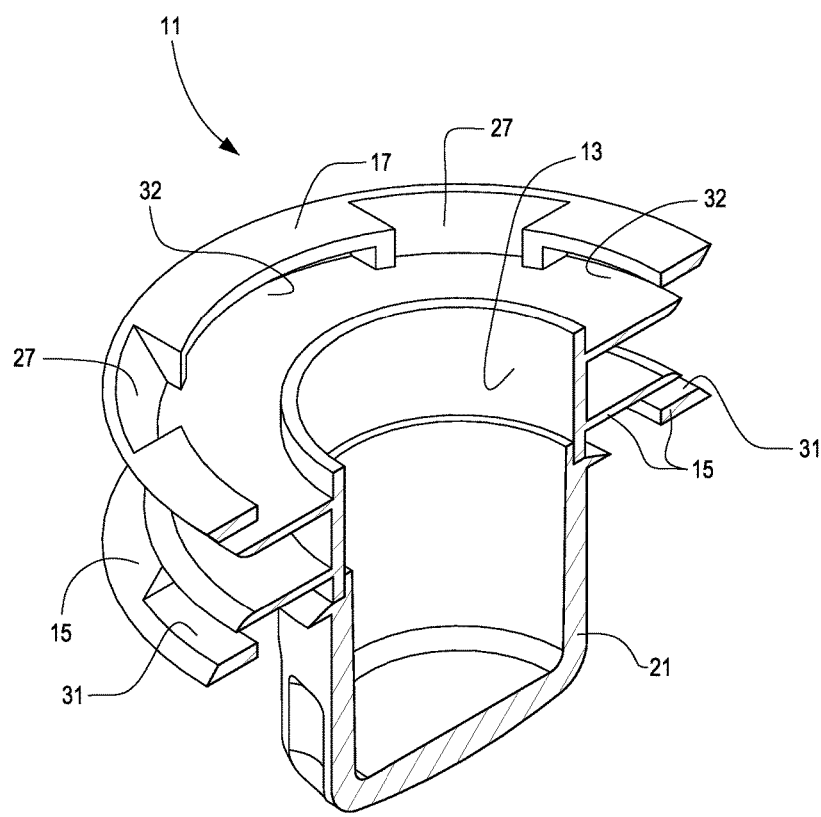
FIG. 40 shows an isometric cross-section of a variant of embodiment of the spool that can be used in the head of FIGS. 33-36.
Figure 41:
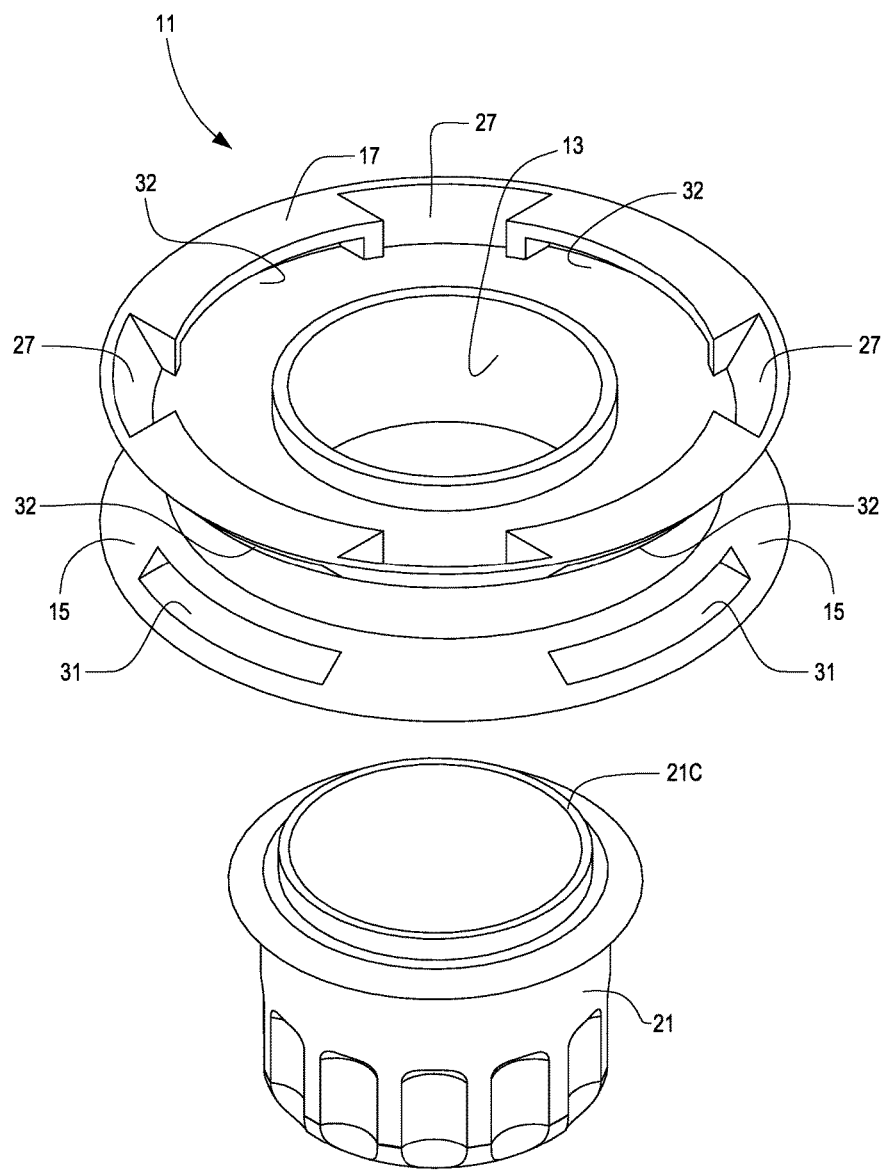
FIG. 41 is an isometric view from the top of the spool of FIG. 40 with the components thereof separated from one another.
Figure 42:
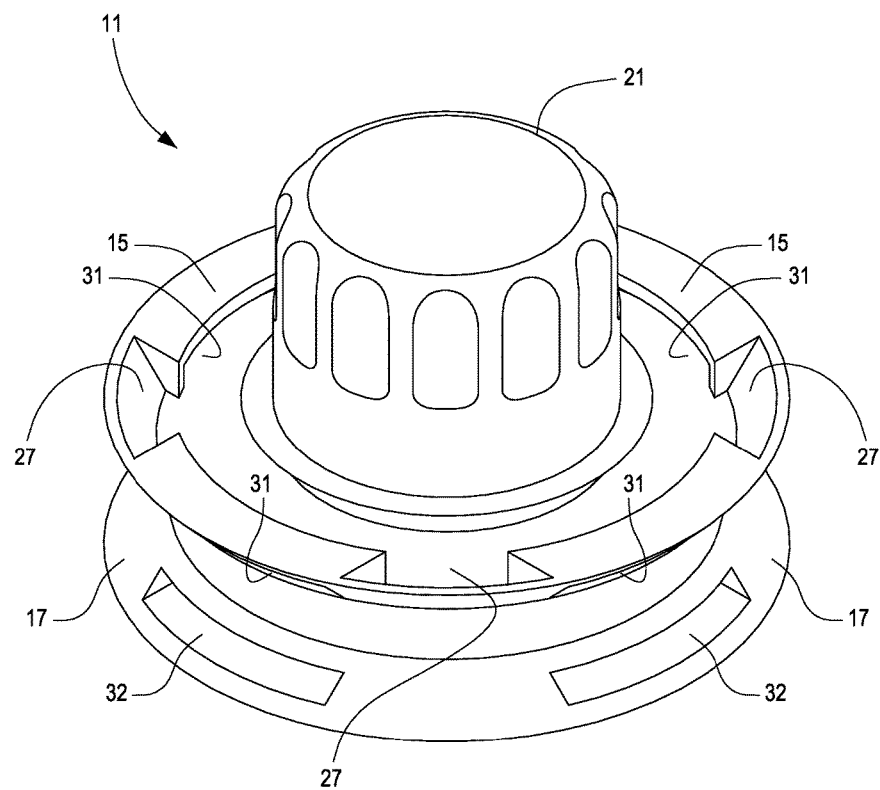
FIG. 42 is an isometric view from the bottom of the spool of FIGS. 40 and 41.

FIGS. 40, 41 and 42 show a spool 11 similar to the spool 11 of FIGS. 37, 38 and 39, but wherein the flanges 15 and 17 are substantially mirror-like and provided with openings 31 in flange 15 and openings 32 in flange 17. The openings 31 and 32 allow the passage of the line between the flange 15 and the transverse wall formed by the lower portion 3B of the housing, or between the flange 17 and the transverse wall opposite to the wall formed by the portion 3B and constituted by the upper part of the dome-shaped portion 3A of the housing 3. As described with reference, for instance, to FIGS. 27 to 32, or 11 to 16, also in the embodiment of FIGS. 40 to 42 the knob 21 of the spool 11 may be formed as a component separate from the axial body 13, which is integrally formed with the first flange 15 and the second flange 17.

Figure 43:
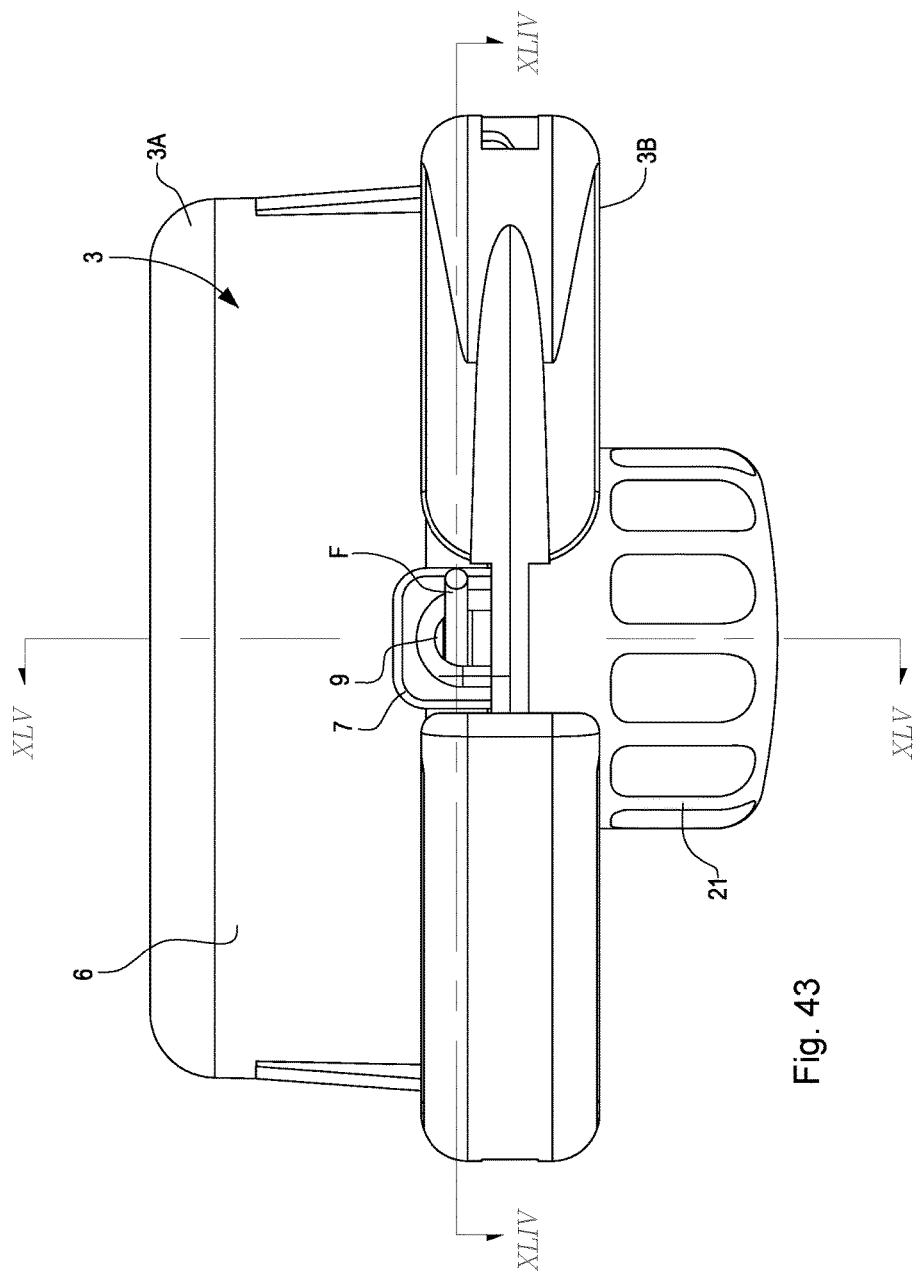
FIG. 43 is a side view of a further embodiment of a head according to the invention.
Figure 44:
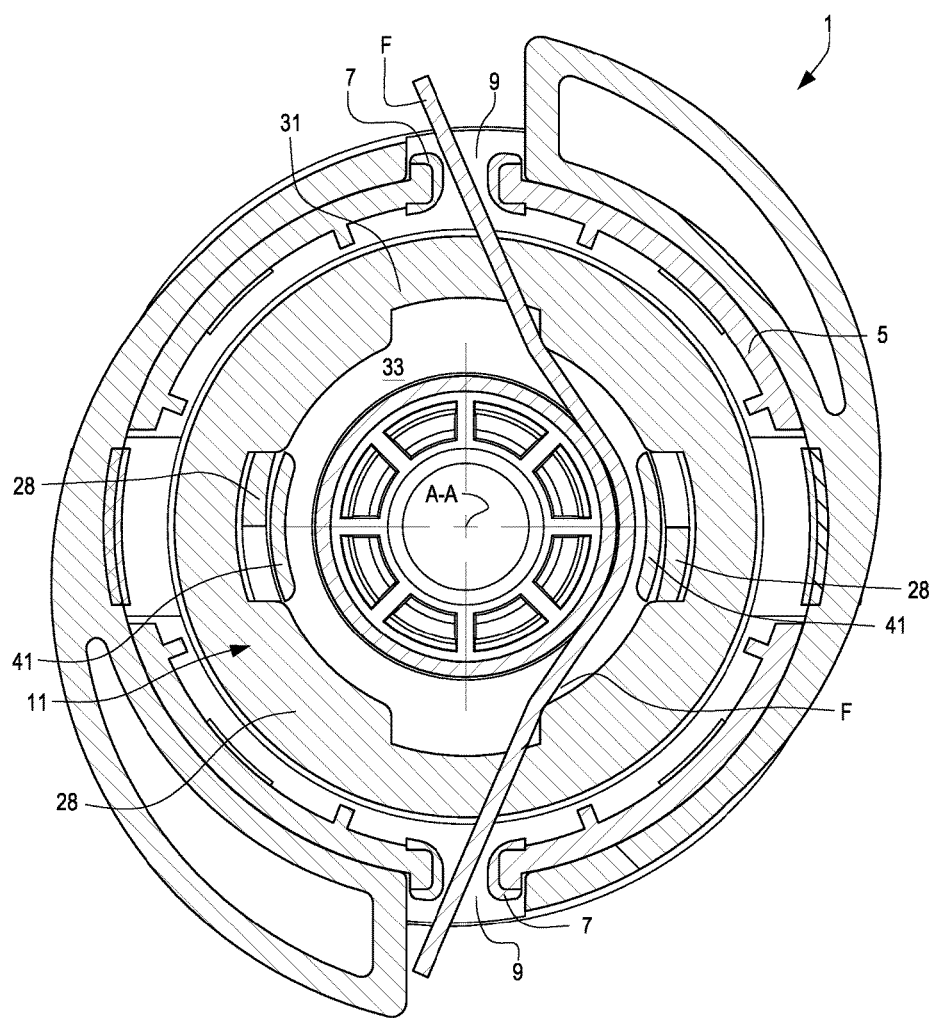
FIG. 44 shows a cross section according to XLIV-XLIV of FIG. 43.
Figure 45:
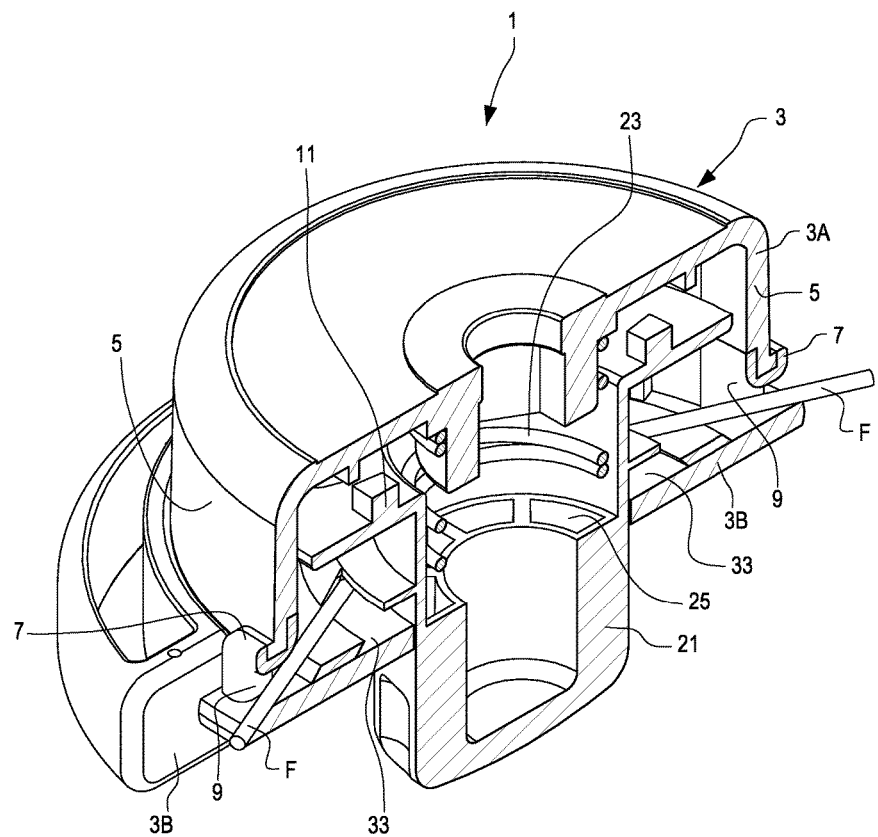
FIG. 45 is an isometric cross-section according to XLV-XLV of FIG. 43.
Figure 46:
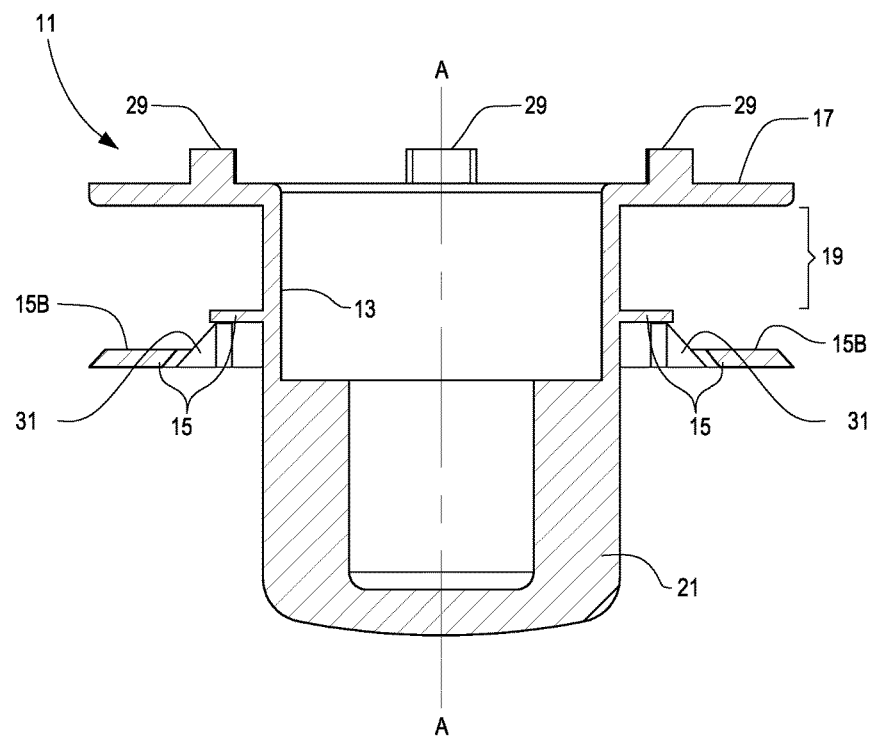
FIG. 46 shows a cross-section according to a plane containing the rotation axis of a spool that can be used with the grass cutting head of FIGS. 43-45.
Figure 47:
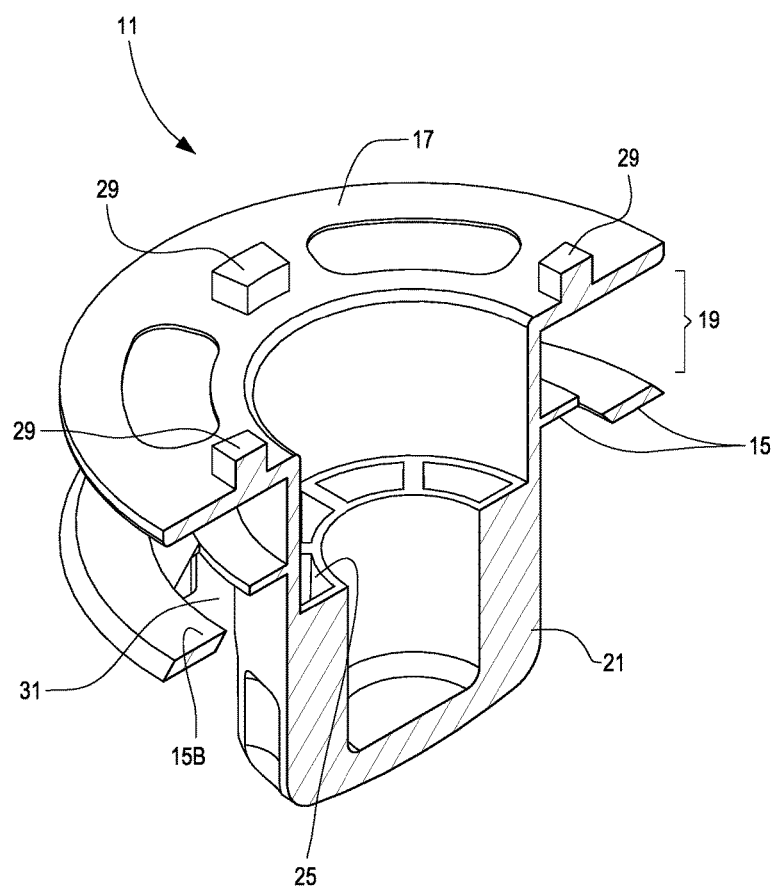
FIG. 47 is an isometric cross-section of the spool of FIG. 46.
Figure 48A:
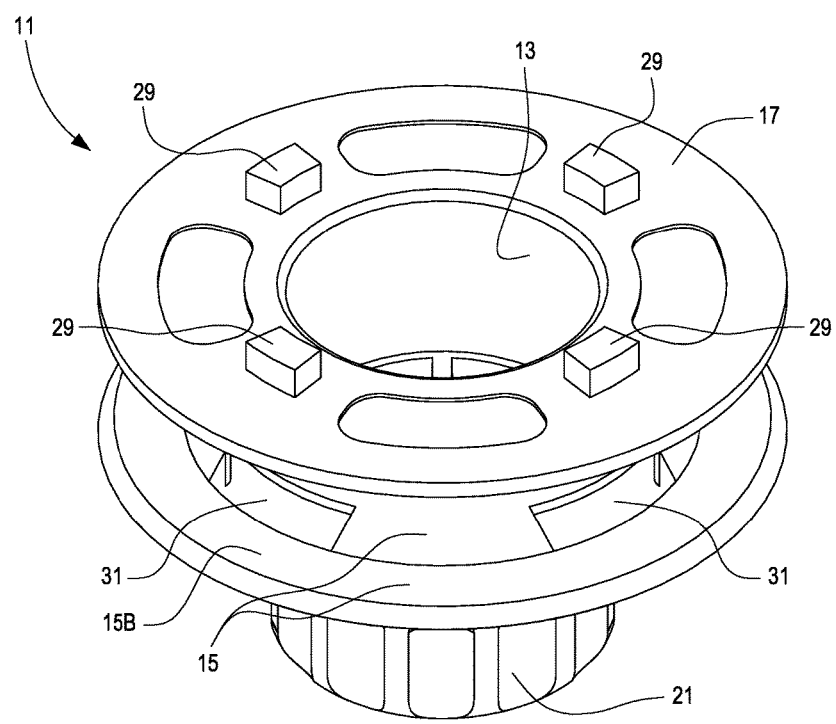
FIGS. 48A and 48B are isometric views from the top and the bottom of the spool of FIGS. 46 and 47.
Figure 48B:
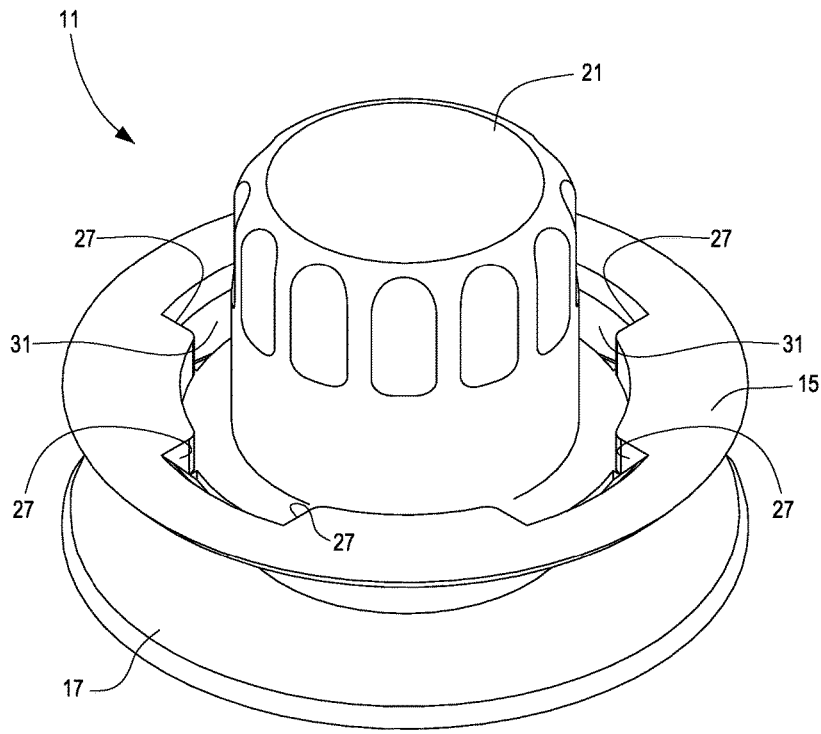

FIGS. 43 to 45 illustrate a further embodiment of a grass cutting head according to the present invention. The same reference numbers indicate the same or equivalent parts to those of the previous embodiments, which will be not described in detail again.

FIGS. 45 to 48 show a spool 11 that can be housed in the grass cutting head 1 of FIGS. 43 to 45. The same reference numbers indicate equal or equivalent parts to that described with reference to the previous embodiments. In this case, the openings 31 provided in the first flange 15 are provided in a truncated-conical portion of the flange 15 set back with respect to a planar perimeter edge indicated with 15B. Compared with the previous embodiments, in this case the openings 31 are arranged in a more retracted position.

The function of the spool and the opening 31 thereof, as well as of the grass cutting head 1 housing it, are substantially equivalent to those already described above.

As shown in particular in the lower view of FIG. 28, in this case again the flange 15 is provided with, notches 27 on its lower surface thereof, which define abutments co-acting with locking teeth 28 (see FIG. 44) useful for the line lengthening mechanism during use. However, contrarily to what described with reference to the previous embodiments, in this case the recesses forming the abutments, by means of which the spool 11 cooperates with the locking teeth 28, are formed at the openings 31, i.e. in the same position where these latter are arranged.

Figure 49:
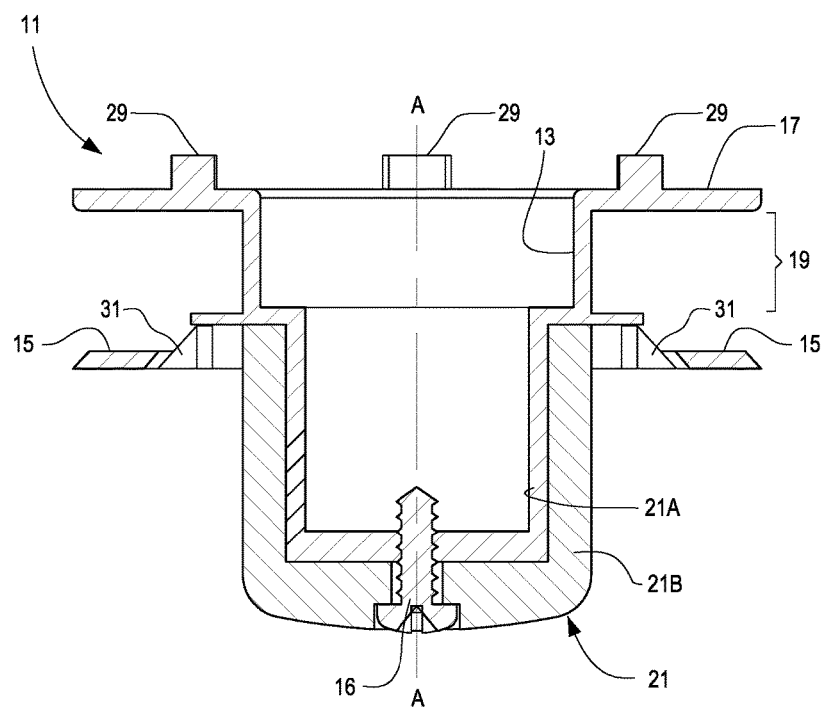
FIG. 49 shows a cross-section according to a plane containing the rotation axis of a variant of embodiment of a spool that can be used with the grass cutting head of FIGS. 43-45.

FIG. 49 shows a modified embodiment of the spool 11 of FIGS. 45 to 48, differing from this latter as in this case the knob 21 of the spool 11 is formed in two parts 21A, 21B, similarly to what described with reference, for example, to FIG. 10. The two parts 21A, 21B may be joined by means of a fastening screw 16. The portion 21B may be cup-shaped and manufactured separately with respect to the main part of the spool 11 comprising the axial body 13, the flange 15 with the openings 31 and the flange 17 with the teeth 29.

Figure 50:
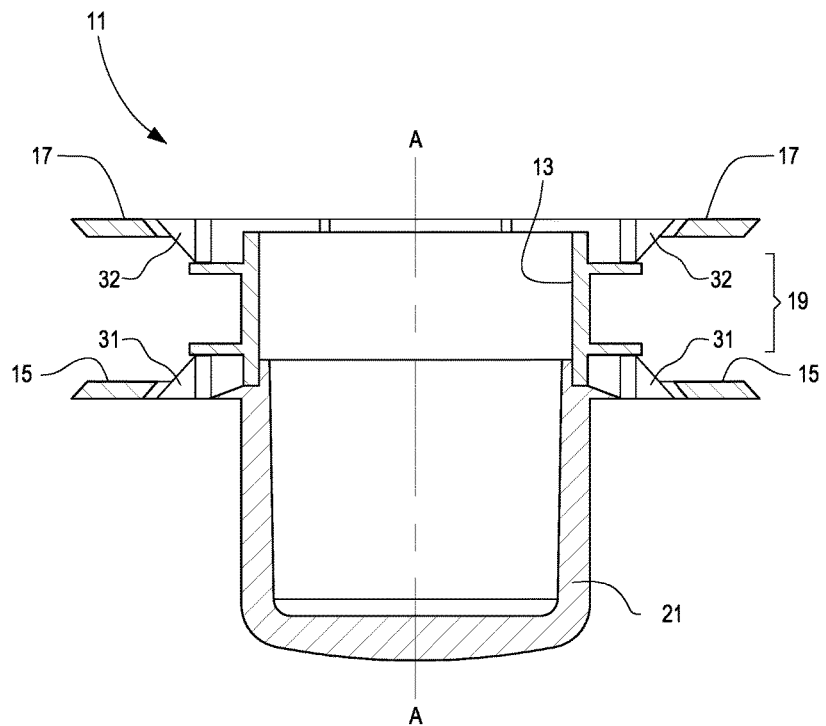
FIG. 50 shows a cross-section according to a plane containing the rotation axis of a further variant of embodiments of a spool that can be used with the grass cutting head of FIGS. 43-45.
Figure 51:
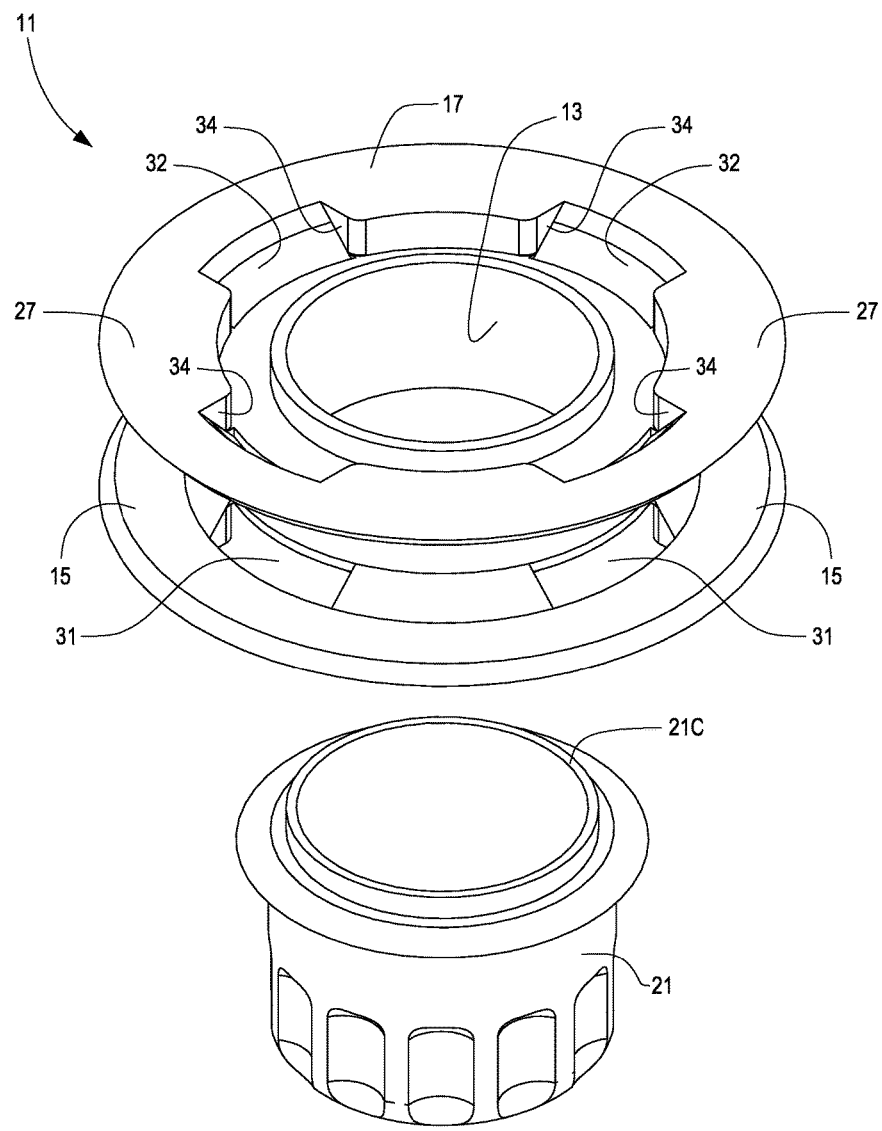
FIG. 51 is an isometric view of the spool of FIG. 50 with the components separated from one another.

FIGS. 50 and 51 show a modified embodiment of the spool of FIGS. 45 to 48. The difference with respect to the previous embodiment is mainly the fact that the two flanges 15 and 17 are, in this case, substantially mirror-like with respect to each other, the lower flange 15 having openings 31 and the upper flange 17 having openings 32 for the insertion of the cutting line F. This latter may pass between the lower flange 15 and the transverse wall formed by the portion 3B of the housing 3, or above the upper flange 17, between this flange and the wall of the portion 3A of the housing 3 opposite to the wall formed by the portion 3B of the housing 3.

The position of the openings 31 and 32 is clearly illustrated in FIG. 51, showing an isometric view of the spool 11 with the knob 21, which can be manufactured as a separate piece, detached from the main body of the spool 11 comprised of the axial body 13 and the flanges 15 and 17. The upper face or surface of the flange 17 has abutments formed by recesses 34 similar to the recesses 27 formed on the lower surface of the flange 15.

In the above illustrated embodiments, grass cutting heads 1 of the so-called bump-n-go type are described, wherein the spool for winding the cutting line has a knob 21 projecting from the bottom of the housing 3 of the head 1, this knob 21 actuating the alternate axial movements of the spool 11 inside the housing 3 to cause, in a known manner, the elongation of the cutting line F, in order to replace the length of cutting line F projecting from the grass cutting head 1 through the passage holes 9.

This feature is however not binding. The inventive concept of facilitating and simplifying the replacement of the cutting line F, i.e. the replacement of a length of cutting line in the winding space 19 formed between the two flanges 15, 17 of the spool, may be also applied to grass cutting heads without a bump-n-go elongation mechanism.

Figure 52:
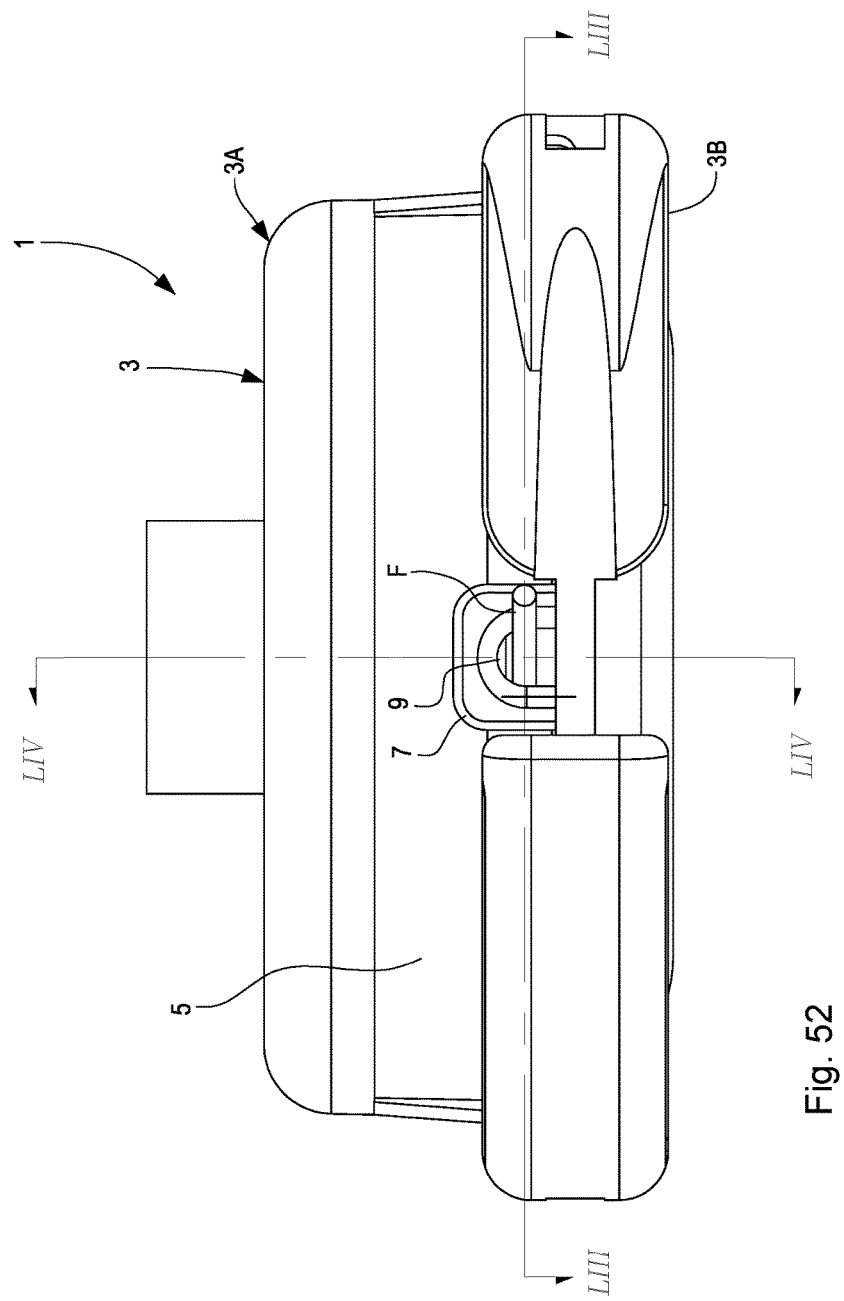
FIG. 52 is a side view of a variant of embodiment of a grass cutting head according to the invention.
Figure 53:
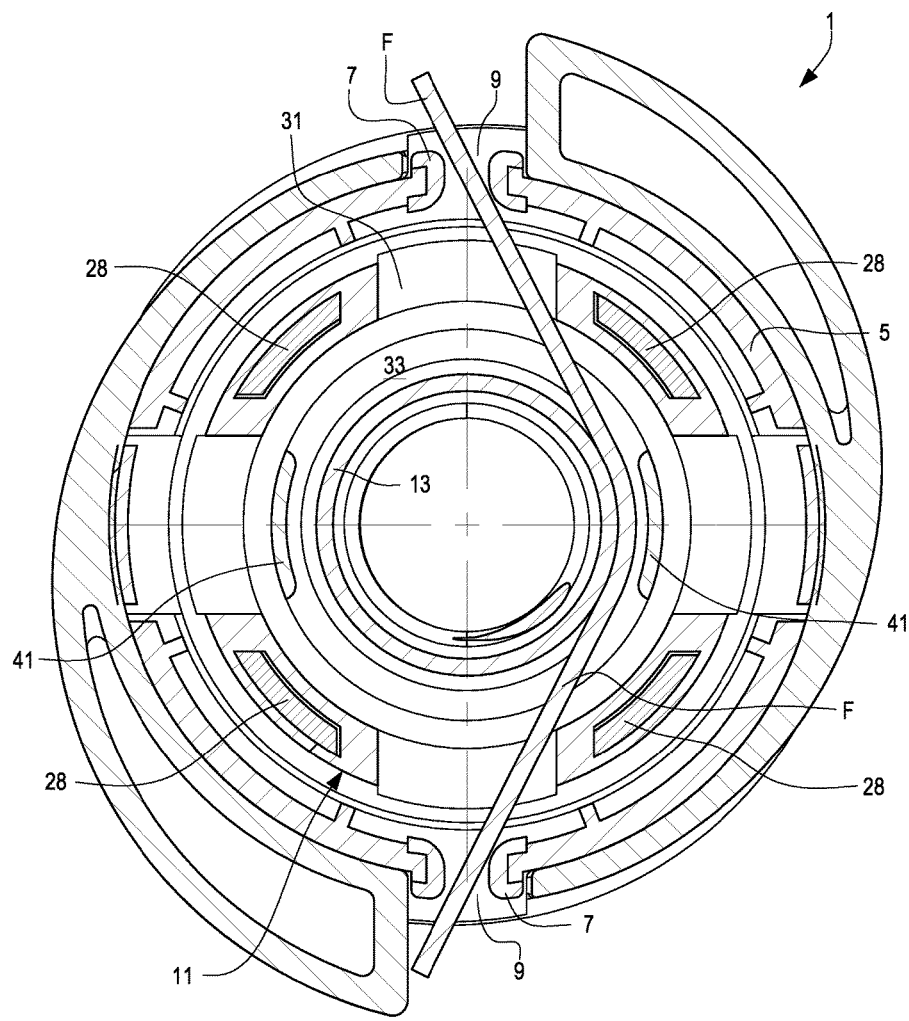
FIG. 53 shows a section according to LIII-LIII in FIG. 52.
Figure 54:
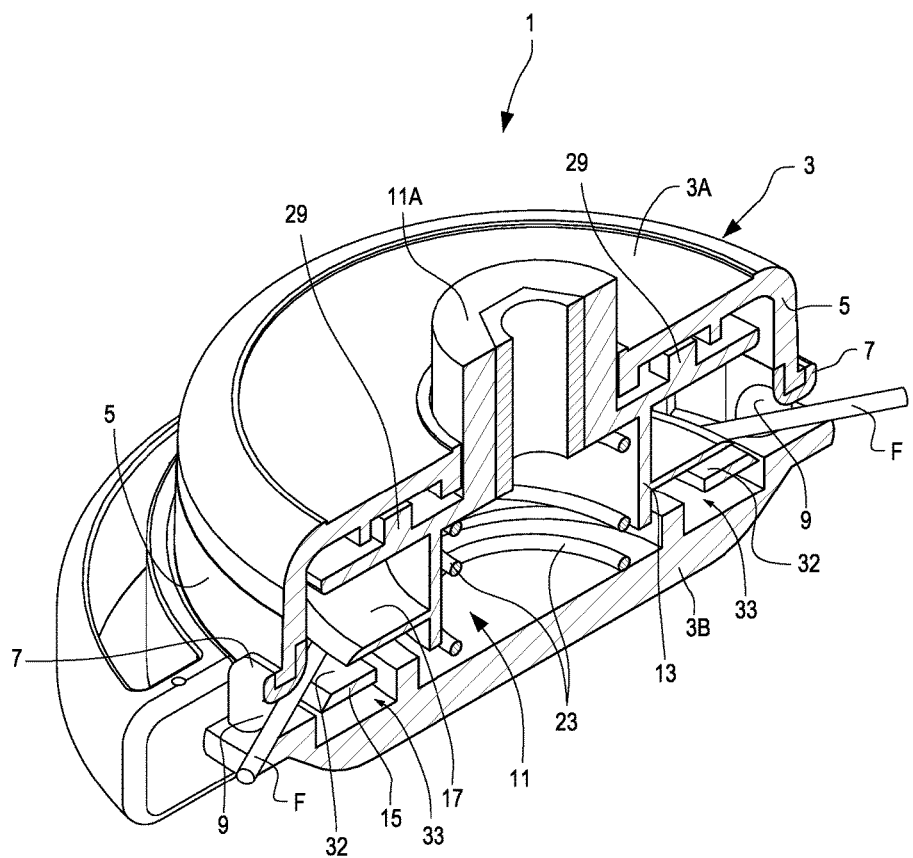
FIG. 54 is an isometric cross-section according to LIV-LIV of FIG. 52.
Figure 55:
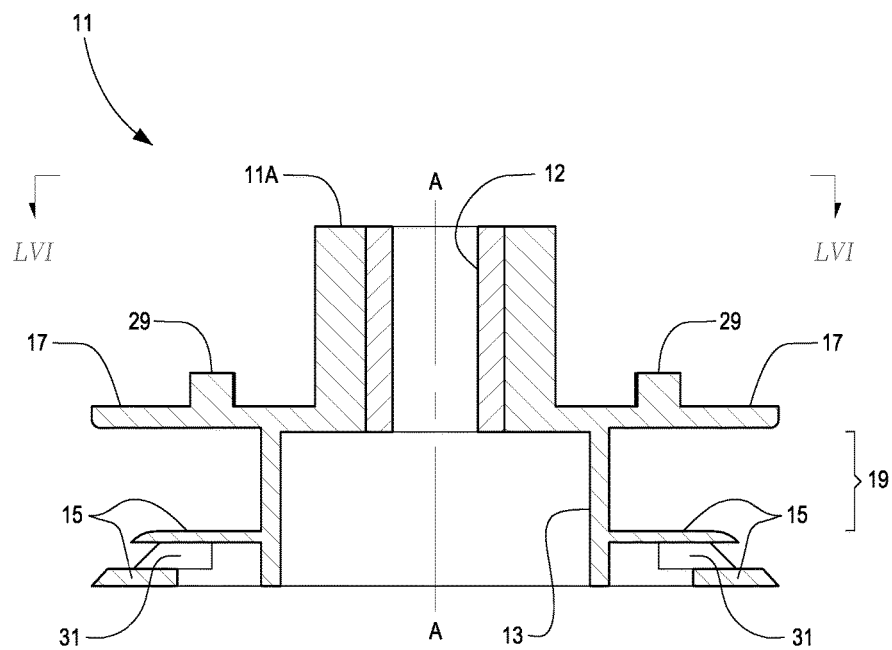
FIG. 55 is a cross-section according to LV-LV of FIG. 56 of a spool that can be used in a grass cutting head according to FIGS. 52-54.
Figure 56:
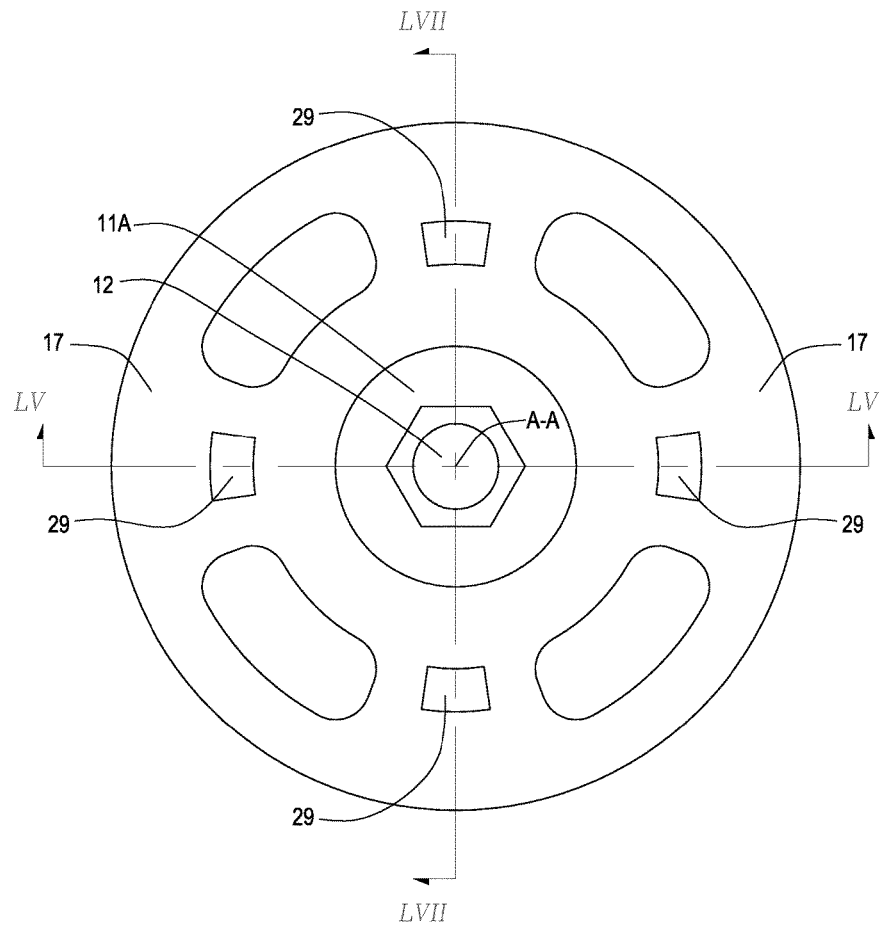
FIG. 56 shows a plan view according to LVI-LVI of FIG. 55.
Figure 57:
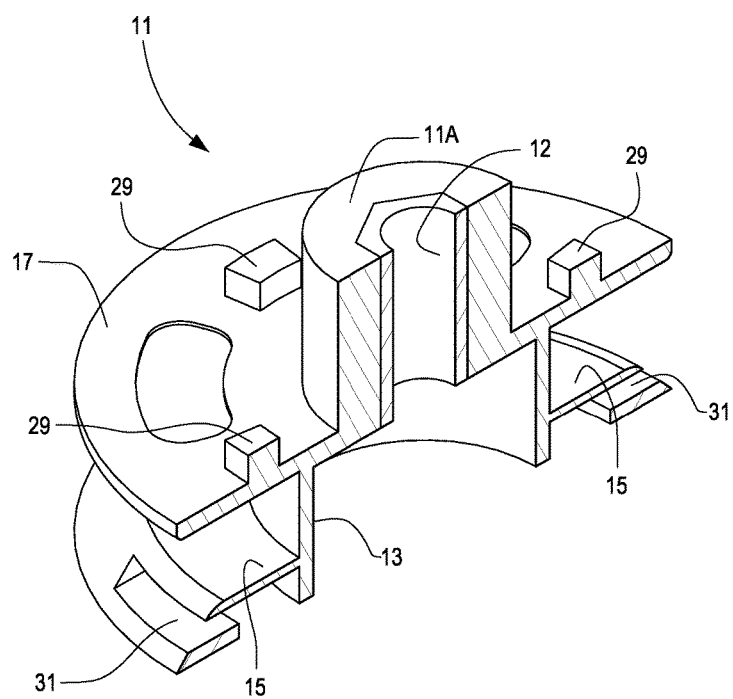
FIG. 57 is an isometric cross-section according to LVII-LVII of FIG. 56.
Figure 58:
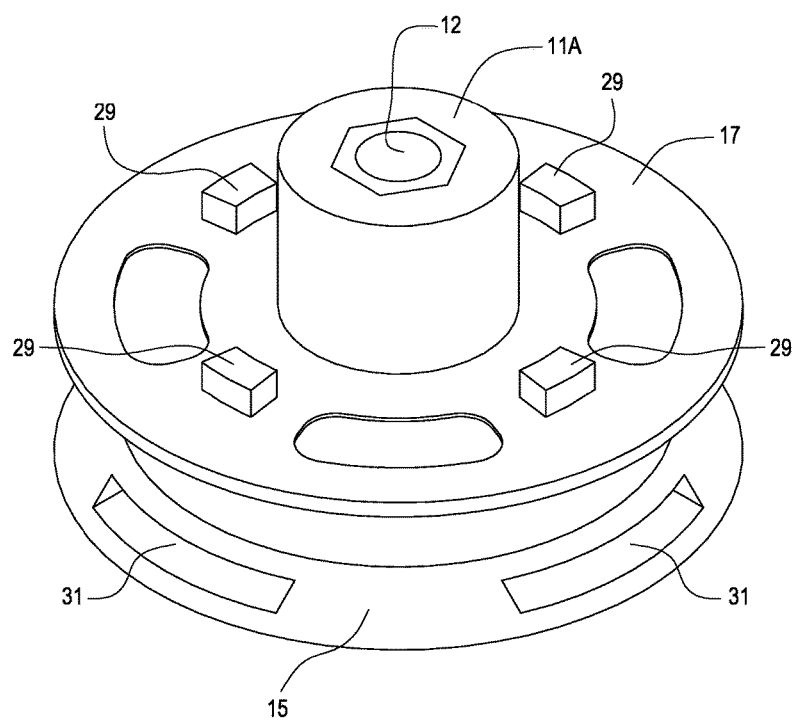
FIGS. 58 and 59 are isometric views from the top and the bottom of the spool of FIGS. 55-57.
Figure 59:
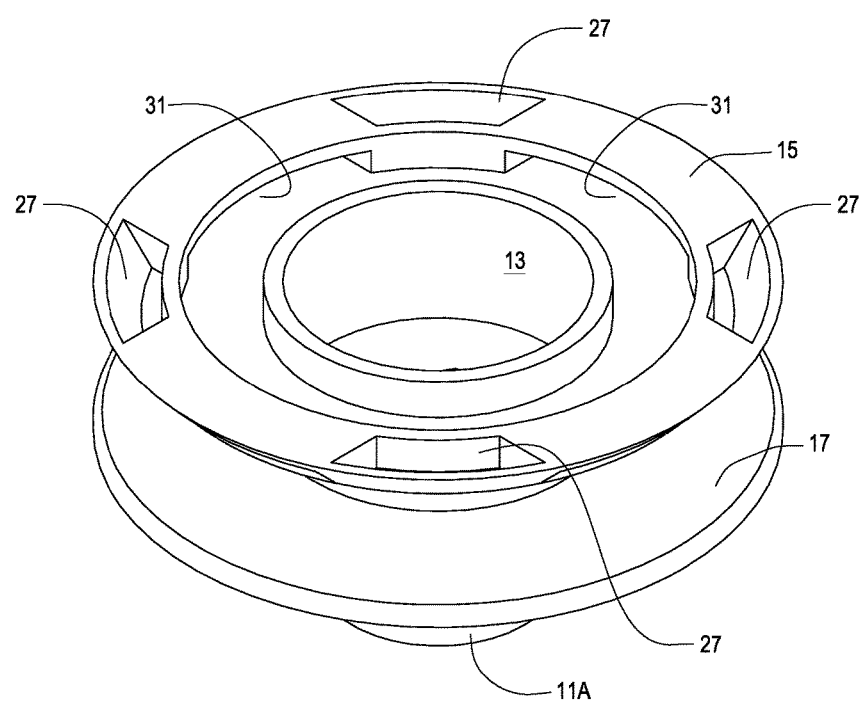

FIGS. 52 to 54 show an embodiment of a head, wherein the elongation of the cutting line is obtained by means of a reverse movement of the spool 11 whereon the cutting line F is wound. In this case, an elastic member, for example a compression spring 23, is arranged inside the grass cutting head 1, as shown in FIG. 54, to push the spool 11 against the bottom of the portion 3A of the housing 3, thus moving the spool 11 away from the transverse wall formed by the portion 3B of the housing 3.

FIGS. 55 to 59 show a spool 11 that can be used in the grass cutting head 1 of FIGS. 52 to 54. The same reference numbers indicate identical or equivalent parts to those already described above. In this case, the spool 11 comprises a first flange 15 and a second flange 17. The first flange 15 has through openings 31 for the passage of the cutting line F that, through the openings 31, may be inserted below the flange 15, between said flange and the transverse wall formed by the portion 3B of the housing 3, when it is necessary to replace the length of cutting line without completely opening the housing portions 3A, 3B and without removing the spool 11 from the housing 3.

The spool 11 of FIGS. 55 to 59 is devoid of the lower knob 21; indeed, it has an upper shank 11A, where an insert 12 may be provided with a threaded hole to fasten the spool 11 to the drive shaft or rotary hub of a bush cutter (not shown).

As shown in FIG. 59, in this case again recesses 27 are provided to co-act with locking teeth 28 integral with the portion 3B of the housing 3.

Figure 60:
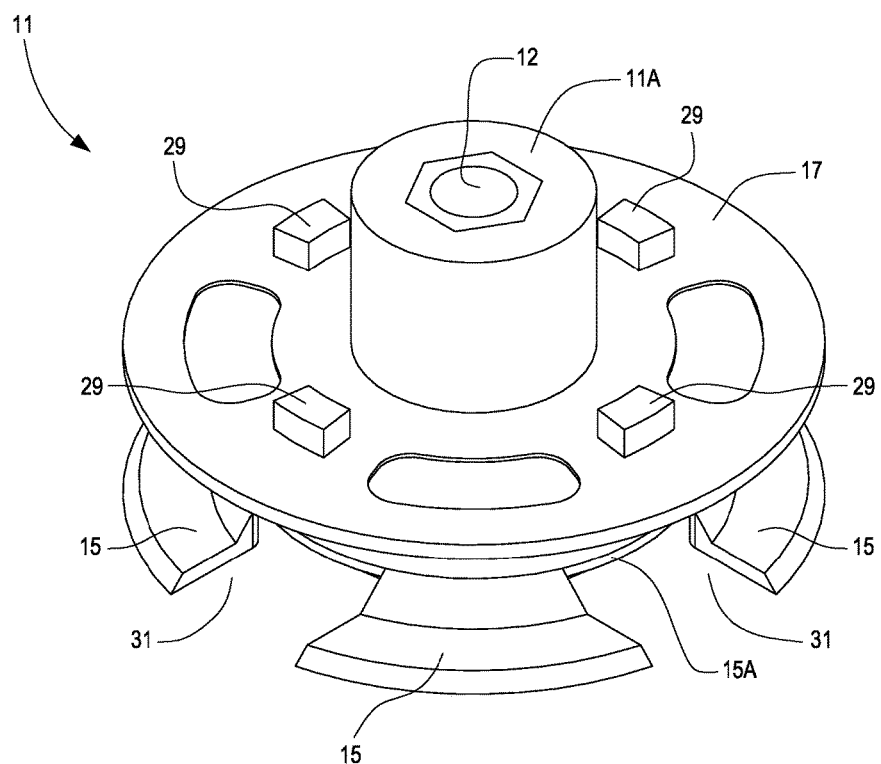
FIGS. 60 and 61 are isometric views from the top and from the bottom of a variant of embodiment of the spool that can be used in the grass cutting head of FIGS. 52-54.
Figure 61:
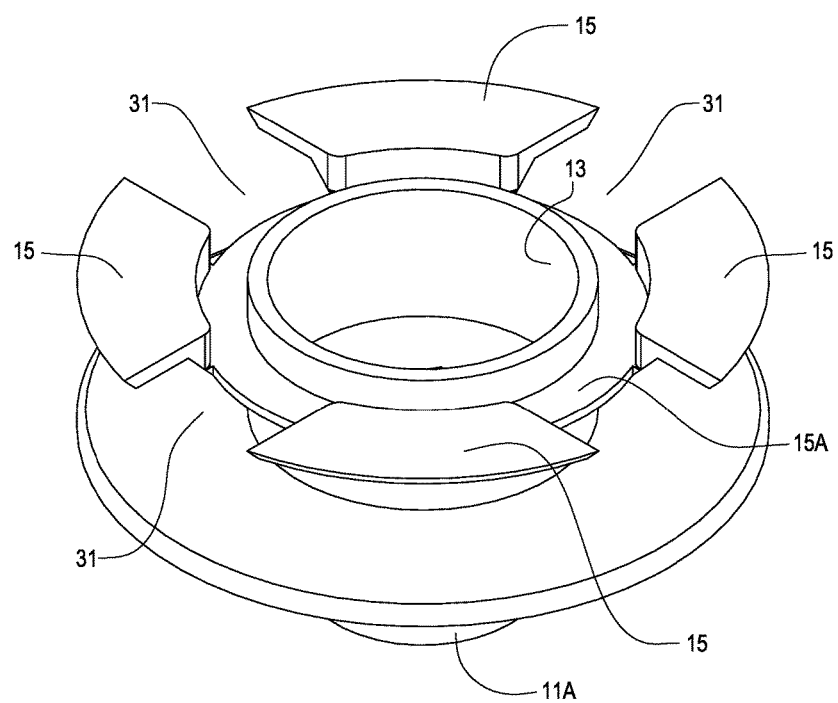

FIGS. 60 and 61 show a modified embodiment of the spool of Figures. 55 to 59. The same reference numbers indicate the same or equivalent parts to those of FIGS. 55 to 59, which will be not described again. In this embodiment, the flange 15 is subdivided into single portions joined to one another by means of a ring 15A, the single portions into which the flange 15 is subdivided being separated from one another by means of openings 31.

Figure 62:
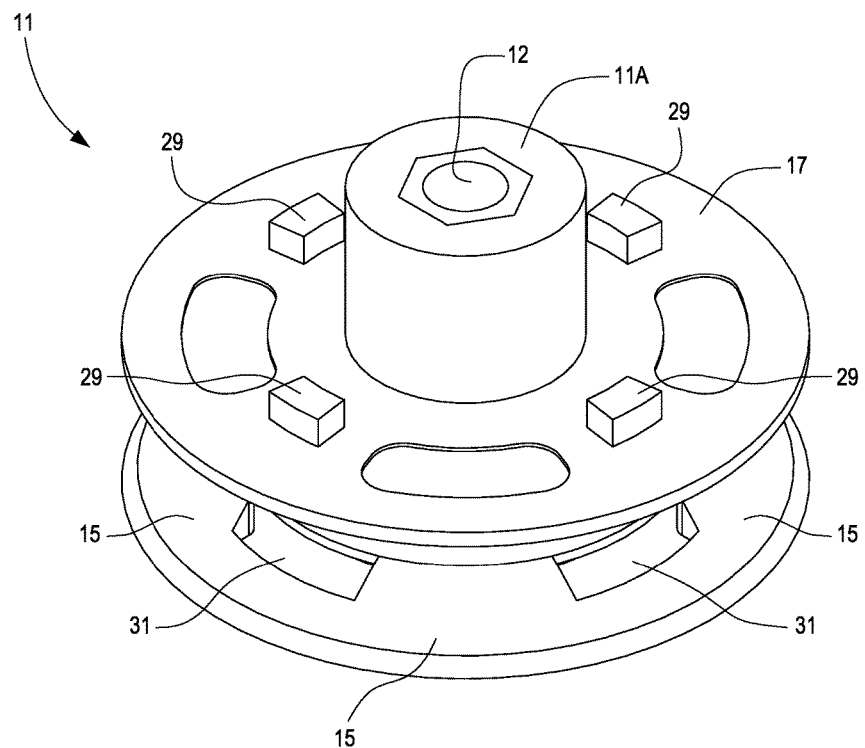
FIGS. 62 and 63 show isometric views from the top and from the bottom of a further variant of embodiment of a spool that can be used in a grass cutting head according to FIGS. 52-54.
Figure 63:
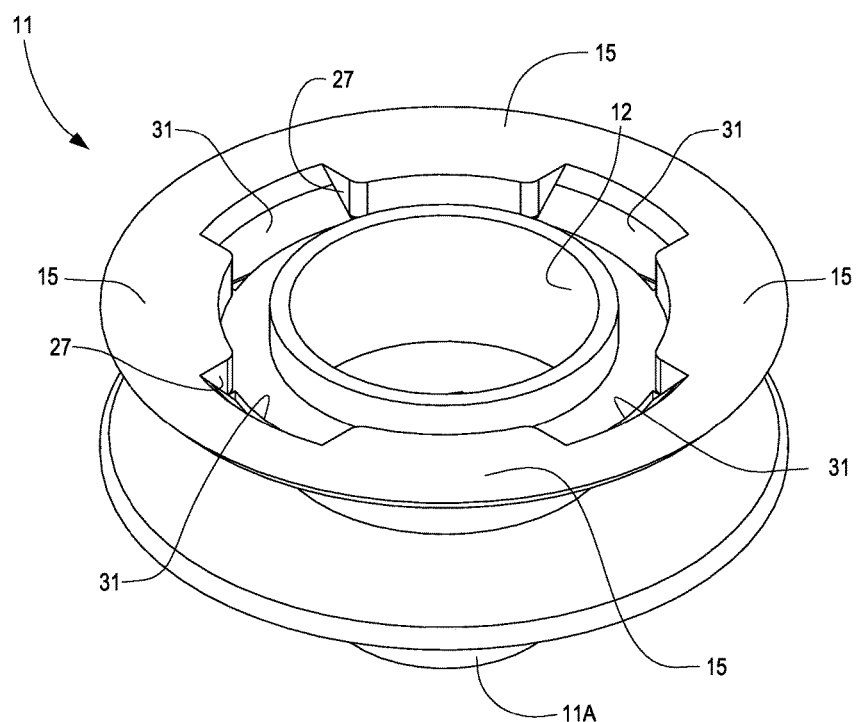

FIGS. 62 and 63 show further modified embodiment of the spool of FIGS. 55 to 59 and of the spool of FIGS. 60 and 61. In this embodiment, the openings 31 formed in the first flange 15 are arranged in a position retracted with respect to the outer perimeter edge, the flange 15 having a truncated-conical portion with a diameter that is smaller than the maximum diameter of the flange 15, with a structure substantially similar to that of the embodiment of the spool shown in FIGS. 45 to 48.

As shown in particular in FIG. 63, in this embodiment the recesses 27 are provided in correspondence of the openings 31, instead of being displaced with respect thereto.

The grass cutting heads 1 described with reference to the accompanying figures have a line lengthening system of the so-called bump-n-go type, wherein the cutting line is supplied towards the outside of the housing 3 by causing an alternate axial movement of the spool 11 while the grass cutting head 1 is rotating, so as consequently to cause an angularly stepped rotation of the spool. It should be understood that the innovative features described herein may be embodied also in heads with other line lengthening systems. For example, the system for inserting the cutting line F between the spool flange and the transverse wall of the housing may be provided also in grass cutting heads where the line elongation is manual. It is also possible to apply the same system for the cutting line insertion without the need for opening the spool housing into grass cutting heads where the line lengthening is controlled completely automatically, for example by means of systems causing the rotation of the spool with respect to the housing of the head according to a change in the angular speed of the head, said change in the angular speed being determined by the wear and the breakage of the cutting line. Automatic systems of this type are known to those skilled in the art.

In fact, in general, what is important is that the grass cutting head and the spool for winding the cutting line F are configured so that the cutting line can be inserted through the grass cutting head without opening the housing and without removing the line winding spool, by simply making the cutting line pass through the two opposite holes provided in the housing and through the at least two openings provided in the spool flange. In this way, the cutting line, passing through the openings of the flange, exits the space where the turns will be then wound, and is inserted in the space delimited between the flange of the spool and the transverse wall of the housing, where the passage for the cutting line is defined.

What is claimed is:

1. A grass cutting head comprising:
   a rotation axis;
   a housing with a perimeter wall extending around the rotation axis and a wall transverse to the rotation axis;
   at least two holes for the passage of the cutting line provided in the perimeter wall of the housing; and
   a cutting line winding spool that can be inserted into the housing, the cutting line winding spool comprising an axial body and at least a first flange that is adjacent to the transverse wall of the housing when the spool is in the housing, wherein the first flange comprises a first surface facing the transverse wall and a second surface opposite the first surface and facing away from the transverse wall, the axial body extending from the second surface away from the transverse wall of the housing, wherein the first flange of the spool has at least a first pair of openings, communicating with a passage for the cutting line, the passage being formed by the first flange and the transverse wall when the spool is in the housing, the passage being configured to guide the cutting line from a first one of the pair of openings towards a second one of the pair of openings, the transverse wall of the housing having projections to guide the cutting line, which face the inside of the housing, the flange comprising a first flange portion and a second flange portion, the first flange portion and the second flange portion defining at least one of the pair of openings.

2. A grass cutting head according to claim 1, wherein the openings of the first flange are arranged along a perimeter edge of the first flange, wherein the passage is located between the first flange and the transverse wall when the spool is in the housing.

3. A grass cutting head according to claim 1, wherein the passage extends about the rotation axis.

4. A grass cutting head according to claim 1, wherein the holes of the housing perimeter wall are diametrically opposite to each other and the openings of the first flange are diametrically opposite to each other, each of the pair of openings being defined by a first flange portion and a second flange portion of the first flange.

5. A grass cutting head according to claim 1, wherein the first flange of the spool has a plurality of pairs of openings, wherein the openings of each pair are opposite to each other, and wherein the pairs are angularly spaced apart from one another around the rotation axis, wherein each of the pairs of openings is located between a first flange portion and a second flange portion of the first flange, the axial body extending parallel to the rotation axis.

6. A grass cutting head according to claim 1, wherein the flange comprises a recess on the surface facing the transverse wall, and wherein the openings are in communication with said recess.

7. A grass cutting head according to claim 1, wherein the guiding projections have a curved shape, with a concavity facing the rotation axis.

8. A grass cutting head according to claim 1, wherein the transverse wall has two guiding projections that are diametrically opposite to one another.

9. A grass cutting head according to claim 1, wherein the spool has a second flange, the first flange and the second flange being axially spaced apart from one another, and the axial body of the spool being arranged between the first flange and the second flange.

10. A grass cutting head according to claim 1, wherein the spool has a knob extending axially from said first flange at an opposite side with respect to the axial body of the spool, the knob projecting from the housing through the transverse wall.

11. A grass cutting head according to claim 1, wherein the flange comprises a truncated-conical portion, and wherein the openings are provided along said truncated-conical portion.

12. A grass cutting head according to claim 11, wherein the truncated-conical portion of the flange forms a perimeter edge of said flange.

* * * * *